United States Patent
Ji et al.

(10) Patent No.: US 12,197,072 B2
(45) Date of Patent: Jan. 14, 2025

(54) BACKLIGHT MODULE, DISPLAY MODULE AND DISPLAY DEVICE

(71) Applicant: Shanghai Tianma Micro-electronics Co., Ltd., Shanghai (CN)

(72) Inventors: Shengchao Ji, Shanghai (CN); Xiao Yang, Shanghai (CN); Kexiong Zhou, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/139,631

(22) Filed: Apr. 26, 2023

(65) Prior Publication Data
US 2024/0241404 A1    Jul. 18, 2024

(30) Foreign Application Priority Data
Jan. 16, 2023   (CN) .......................... 202310074930.0

(51) Int. Cl.
*G02F 1/00* (2006.01)
*G02F 1/13357* (2006.01)

(52) U.S. Cl.
CPC .. *G02F 1/133606* (2013.01); *G02F 1/133603* (2013.01); *G02F 1/133605* (2013.01)

(58) Field of Classification Search
None
See application file for complete search history.

(56) References Cited

U.S. PATENT DOCUMENTS

| | | | |
|---|---|---|---|
| 2016/0258603 A1* | 9/2016 | Yokotani | F21V 5/04 |
| 2020/0371397 A1* | 11/2020 | An | G02B 5/28 |
| 2021/0157204 A1* | 5/2021 | Park | G02F 1/133611 |

FOREIGN PATENT DOCUMENTS

| | | |
|---|---|---|
| CN | 106842701 B | 6/2017 |
| CN | 208621882 U | 3/2019 |

* cited by examiner

*Primary Examiner* — Gerald J Sufleta, II
(74) *Attorney, Agent, or Firm* — Anova Law Group, PLLC

(57) ABSTRACT

A backlight module, a display module, and a display device are provided. The backlight module includes a light-emitting area including a first light-emitting area and a second light-emitting area. The second light-emitting area at least partially surrounds the first light-emitting area. The backlight module also includes a light-emitting structure including a plurality of light-emitting elements distributed in the light-emitting area, and a diffusion plate located on a side of a light exiting surface of the light-emitting structure and at least partially located in the light-emitting area. The backlight module also includes a reflection structure located on a surface of the diffusion plate facing the light-emitting structure. The reflection structure overlaps with the first light-emitting area.

20 Claims, 13 Drawing Sheets

200

300

BACKLIGHT MODULE, DISPLAY MODULE AND DISPLAY DEVICE

CROSS-REFERENCE TO RELATED APPLICATION

This application claims priority of Chinese Patent Application No. 202310074930.0, filed on Jan. 16, 2023, the entire content of which is hereby incorporated by reference.

FIELD OF THE DISCLOSURE

The present disclosure generally relates to the field of display technology and, more particularly, relates to a backlight module, a display module and a display device.

BACKGROUND

With rapid development of liquid crystal display industry, customers may have higher requirements for display devices, and demand for high dynamic contrast ratios of display devices may increase significantly. In existing technologies, even if light sources in a display panel are uniformly arranged on a substrate, problems of undesirable uniformity of display effects may not be avoided. For example, problems of low display brightness at edge areas and corner areas of a display device may appear, resulting in undesirable display effects of the display device.

SUMMARY

One aspect of the present disclosure includes a backlight module. The backlight module includes a light-emitting area including a first light-emitting area and a second light-emitting area. The second light-emitting area at least partially surrounds the first light-emitting area. The backlight module also includes a light-emitting structure including a plurality of light-emitting elements distributed in the light-emitting area, and a diffusion plate located on a side of a light exiting surface of the light-emitting structure and at least partially located in the light-emitting area. The backlight module also includes a reflection structure located on a surface of the diffusion plate facing the light-emitting structure. The reflection structure overlaps with the first light-emitting area.

Another aspect of the present disclosure includes a display module. The display module includes a backlight module and a display panel. The backlight module includes a light-emitting area, a light-emitting structure, a diffusion plate, and a reflection structure. The light-emitting area includes a first light-emitting area and a second light-emitting area, and the second light-emitting area at least partially surrounds the first light-emitting area. The light-emitting structure includes a plurality of light-emitting elements distributed in the light-emitting area. The diffusion plate is located on a side of a light exiting surface of the light-emitting structure, and is at least partially located in the light-emitting area. The reflection structure is located on a surface of the diffusion plate facing the light-emitting structure, and the reflection structure overlaps with the first light-emitting area. The display panel is disposed on a side of the diffusion plate away from the light-emitting structure.

Another aspect of the present disclosure includes a display device. The display device includes a display module. The display module includes a backlight module and a display panel. The backlight module includes a light-emitting area, a light-emitting structure, a diffusion plate, and a reflection structure. The light-emitting area includes a first light-emitting area and a second light-emitting area, and the second light-emitting area at least partially surrounds the first light-emitting area. The light-emitting structure includes a plurality of light-emitting elements distributed in the light-emitting area. The diffusion plate is located on a side of a light exiting surface of the light-emitting structure, and is at least partially located in the light-emitting area. The reflection structure is located on a surface of the diffusion plate facing the light-emitting structure, and the reflection structure overlaps with the first light-emitting area. The display panel is disposed on a side of the diffusion plate away from the light-emitting structure.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
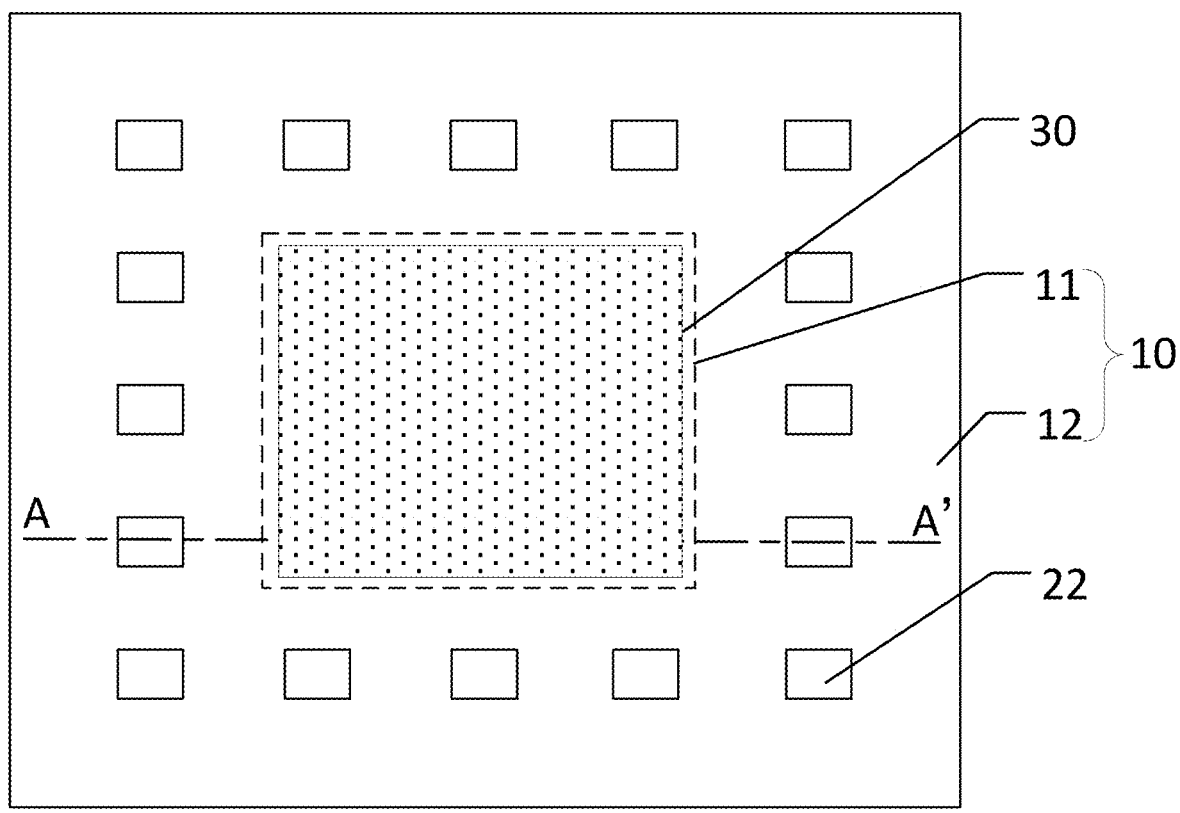
FIG. 1 illustrates a top view of a backlight module consistent with the disclosed embodiments of the present disclosure.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

In the present disclosure, any specific values should be construed as examples only, and not as limitations. Different embodiments may have different values.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

In existing technologies, even if light sources in a display panel are uniformly arranged on a substrate, problems of undesirable uniformity of display effects may not be avoided. For example, problems of low display brightness at edge areas and corner areas of a display device may appear, resulting in undesirable display effects of the display device. To address problems of undesirable display uniformity of display devices, the present disclosure provides a backlight module, a display module, and a display device.

Figure 2:
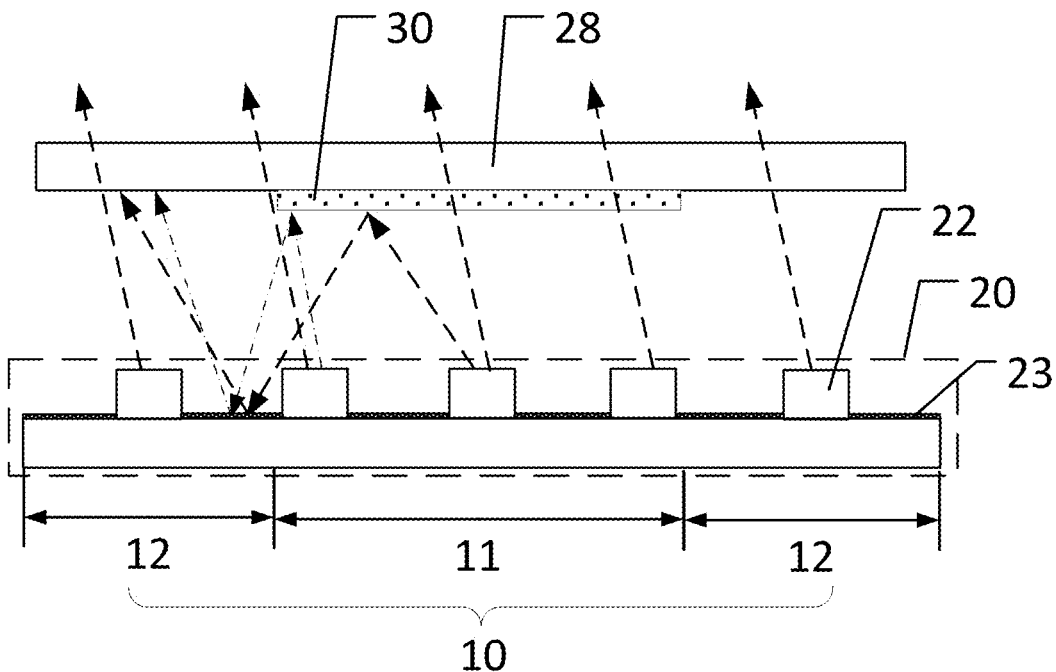
FIG. 2 illustrates a cross-sectional view along AA' in FIG. 1, consistent with the disclosed embodiments of the present disclosure.
Figure 3:
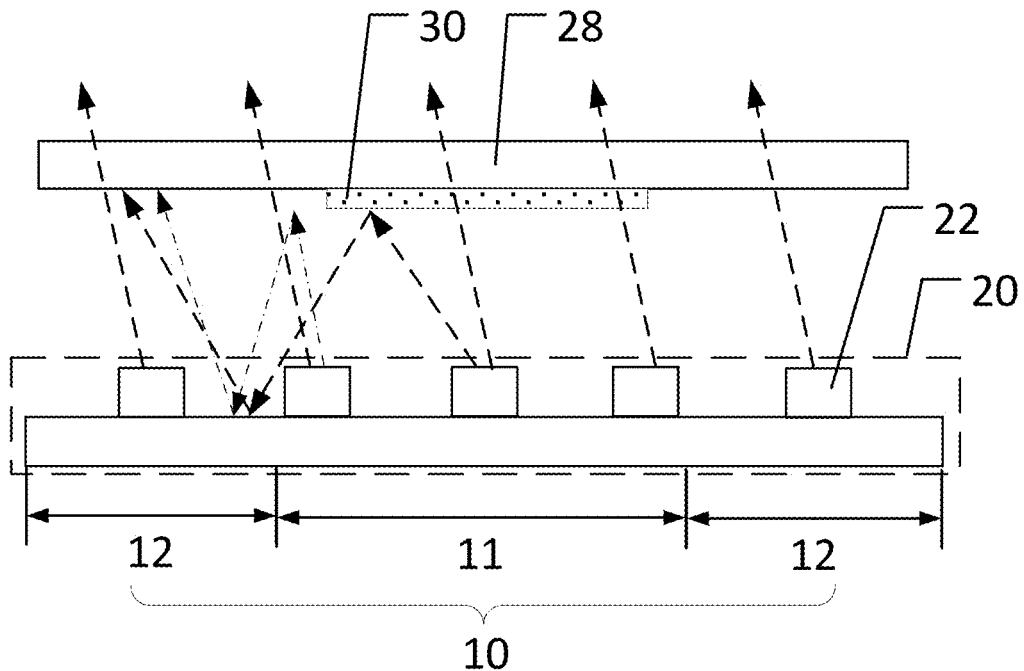
FIG. 3 illustrates another cross-sectional view along AA' in FIG. 1, consistent with the disclosed embodiments of the present disclosure.
Figure 4:
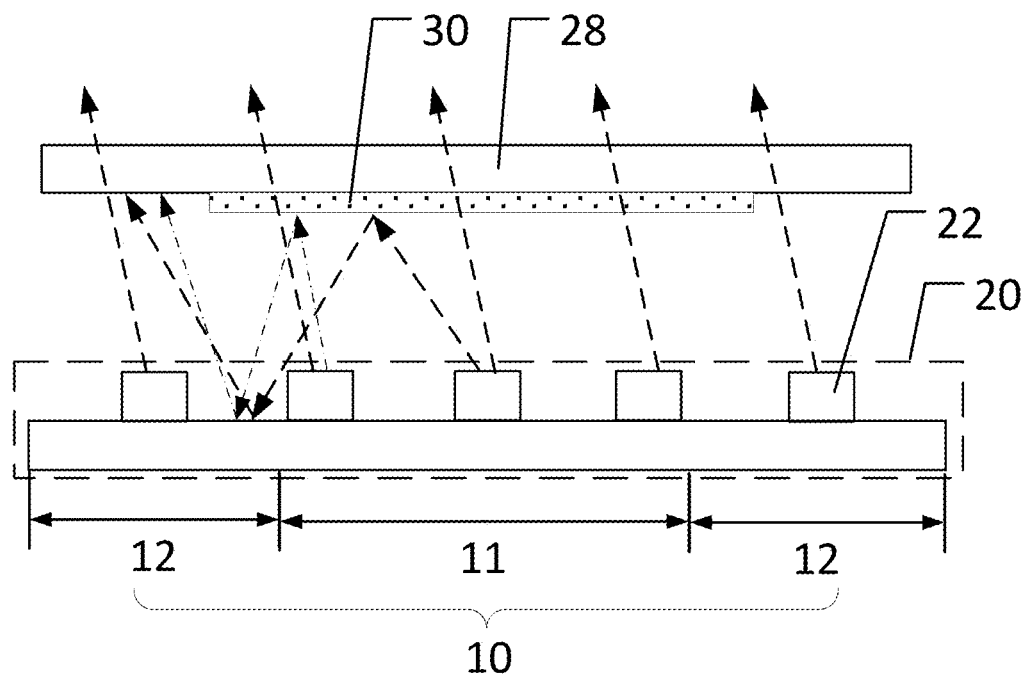
FIG. 4 illustrates another cross-sectional view along AA' in FIG. 1, consistent with the disclosed embodiments of the present disclosure.

FIG. 1 illustrates a top view of a backlight module consistent with the disclosed embodiments of the present disclosure. FIG. 2 illustrates a cross-sectional view along AA' in FIG. 1. FIG. 3 illustrates another cross-sectional view along AA' in FIG. 1. FIG. 4 illustrates another cross-sectional view along AA' in FIG. 1. With reference to FIGS. 1-4, the present disclosure provides a backlight module 100, including a light-emitting area 10, a light-emitting structure 20, a diffusion plate 28, and a reflection structure 30.

The light-emitting area 10 includes a first light-emitting area 11 and a second light-emitting area 12 at least partially surrounding the first light-emitting area 11. The light-emitting structure 20 includes a plurality of light-emitting elements 22 distributed in the light-emitting area 10. A diffusion plate 28 is located on a side of a light exiting surface of the light-emitting structure 20, and is at least partially located in the light-emitting area 10. The reflection structure 30 is located on a surface of the diffusion plate 28 facing the light-emitting structure 20 and overlaps with the first light-emitting area 11.

Specifically, the present disclosure provides a backlight module 100. The backlight module 100 may include a light-emitting area 10. The light-emitting area 10 may include a first light-emitting area 11 and a second light-emitting area 12. In the present disclosure, as an example, the second light-emitting area 12 at least partially surrounds the first light-emitting area 11. In existing technologies, difference between the first light-emitting area and the second light-emitting area includes different display effects of the first light-emitting area and the second light-emitting area. The first light-emitting area surrounded by the second light-emitting area may be a region with good display uniformity. The second light-emitting area may have problems of dark corners or dark areas, that is, the display uniformity of the second light-emitting area may be undesirable. For example, when the brightness of the second light-emitting area is less than approximately 75% of the brightness of the first light-emitting area, display difference between the second light-emitting area and the first light-emitting area may be observed when displaying pictures. As such, the corresponding device may not have ideal display effects.

The backlight module 100 provided by the present disclosure may specifically include a light-emitting structure 20, a diffusion plate 28 and a reflection structure 30. The diffusion plate 28 may be disposed on a side of the light-exiting surface of the light-emitting structure 20. The reflection structure 30 may be disposed on a surface of the diffusion plate 28 facing the light-emitting structure 20. The light-emitting structure 20 may completely overlap the entire light-emitting area 10. The diffusion plate 28 may completely overlap the entire light-emitting area 10. The reflection structure 30 may overlap the first light-emitting area 11 at least partially.

In addition, the light-emitting structure 20 in the backlight module 100 may include a plurality of light-emitting elements 22. The light-emitting elements 22 are configured to realize the light-emitting function of the backlight module 100, and serves as light sources of the backlight module 100. Further, relationships between the reflection structure 30 and the light-emitting area 10 may be set in such a way that, as shown in FIG. 3, the reflection structure 30 is located within the first light-emitting area 11, or as shown in FIG. 2, the reflection structure 30 completely overlaps the first light-emitting area 11, or as shown in FIG. 4, the reflection structure 30 is slightly larger than the first light-emitting area 11, that is, the reflection structure 30 may entirely cover the first light-emitting area 11.

As shown in FIG. 3, along a direction perpendicular to a plane where the diffusion plate 28 is located, an orthographic projection of the reflection structure 30 may be located within the first light-emitting area 11. Although the area of the reflection structure 30 may be relatively small, when part of the light emitted by the light-emitting element 22 is irradiated on the reflection structure 30, part of the light may be reflected toward the second light-emitting area 12. Accordingly, the amount of light in the second light-emitting area 12 may be increased, and the luminous brightness of the second light-emitting area 12 may thus be improved.

As shown in FIG. 2, along the direction perpendicular to the plane where the diffusion plate 28 is located, the orthographic projection of the reflection structure 30 may have a same size as the first light-emitting area 11. Compared to the reflection structure 30 shown in FIG. 3, the area of the reflection structure 30 shown in FIG. 2 is larger. Accordingly, a larger amount of the light emitted by the light-emitting elements 22 may be irradiated on the reflection structure 30. The reflection structure 30 may thus reflect a larger amount of light toward the second light-emitting area 12. As such, the amount of light in the second light-emitting area 12 10 may be further increased, and the luminous brightness of the second light-emitting area 12 may thus be further improved.

As shown in FIG. 4, along the direction perpendicular to the plane where the diffusion plate 28 is located, the orthographic projection of the reflection structure 30 may be larger than the first light-emitting area 11. Compared to the reflection structures 30 shown in FIGS. 2 and 3, the area of the reflection structure 30 shown in FIG. 4 may be larger. Accordingly, a larger amount of the light emitted by the light-emitting elements 22 may be irradiated on the reflection structure 30, and the reflection structure 30 may reflect a larger amount of light toward the second light-emitting area 12. As such, the amount of light in the second light-emitting area 12 may be further increased, and the luminous brightness of the second light-emitting area 12 may thus be further improved.

In addition, when the area of the second light-emitting area 12 is large, the second light-emitting area may have shadows at the edge areas and corner areas that are farther away from the first light-emitting area. Accordingly, As shown in FIG. 4, by setting a larger area of the reflection structure 30, more light irradiated on the surface of the reflection structure 30 may be reflected to the edge areas and the corner areas on a side of the second light-emitting area 12 that is farther away from the first light-emitting area 11. Accordingly, the brightness of the edge areas and the corner areas on the side of the second light-emitting area 12 that is farther away from the first light-emitting area 11 may be improved, and the overall luminous brightness of the second light-emitting area 12 may be improved in a targeted manner. As a result, the difference in luminous brightness between the first light-emitting area 11 and the second light-emitting area 12 may be reduced or eliminated.

To sum up, in the present disclosure, the reflection structure 30 is disposed on the side of the diffusion plate 28 facing the light-emitting structure 20. The reflection structure 30 has a function of reflecting light. When the light emitted by the light-emitting elements 22 is emitted toward the diffusion plate 28 during operation, when the light is irradiated on the surface of the reflection structure 30, part of the light may be reflected by the reflection structure 30 disposed on the surface of the diffusion plate 28. That is, part of the light may be reflected toward the light-emitting structure 20 when the light is irradiated on the reflection structure 30. In this case, part of the light may be reflected to the side near the outer edge of the light-emitting area 10. For example, part of the light may be reflected toward the second light-emitting area 12. In this way, the amount of light in the side near the outer edge of the light-emitting area 10 may be increased, and the luminous brightness of the side near the outer edge of the light-emitting area 10 may thus be improved. Accordingly, problems of dark areas and dark corners of the edge area (such as the second light-emitting area 12) in the light-emitting area 10 in the display process in existing technologies may be avoided. As such, the overall luminous uniformity of the backlight module 100 may be improved, and a corresponding display device may have a good display effect.

The reflection structure 30 provided by the present disclosure may not reflect light at 100%. When the light emitted by the light-emitting elements 22 exits toward the diffusion plate 28, part of the light may be reflected by the reflection structure 30, and part of the light may pass through the reflection structure 30 and the diffusion plate 28 and then exit. As such, part of the light may be reflected toward the second light-emitting area 12 by the reflection structure 30, and meanwhile, the normal display function of the first light-emitting area 11 may be maintained. Accordingly, the problem of decrease in display brightness of the first light-emitting area 11 may be avoided, and the normal display effect of the corresponding display device may thus be maintained.

Figure 5:
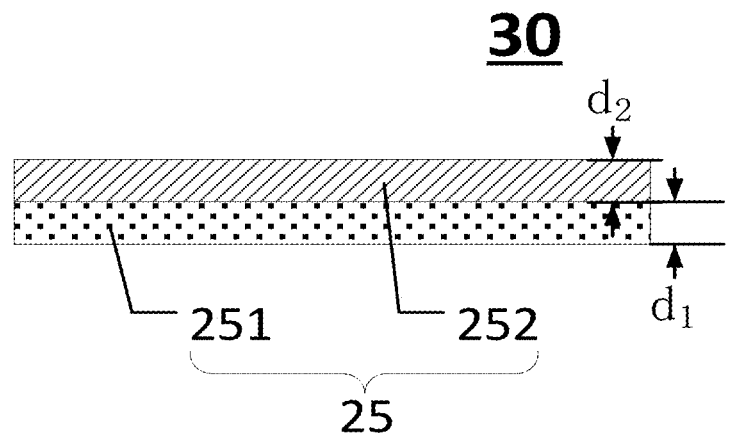
FIG. 5 illustrates a schematic structural diagram of a reflection structure consistent with the disclosed embodiments of the present disclosure.

FIG. 5 illustrates a schematic structural diagram of a reflection structure consistent with the disclosed embodiments of the present disclosure. With reference to FIGS. 1, 2, 5, the reflection structure 30 may include at least one first reflection layer 25. Along the direction perpendicular to the plane where the light-emitting structure 20 is located, the first reflection layer 25 may include a first dielectric layer 251 and a second dielectric layer 252 arranged in a stacked way. The first dielectric layer 251 is located on a side of the second dielectric layer 252 facing the light-emitting structure 20. The refractive index of the first dielectric layer 251 is $\alpha 1$, and the refractive index of the second dielectric layer 252 is $\alpha 2$, with $\alpha 1 > \alpha 2$.

Specifically, the present disclosure also provides an optional setting method. The reflection structure 30 may include at least one first reflection layer 25. The first reflection layer 25 may include a first dielectric layer 251 and a second dielectric layer 252 that are arranged in a stacked way. The first dielectric layer 251 and the second dielectric layer 252 may have different refractive indices. For example, the refractive index of the first dielectric layer 251 may be greater than the refractive index of the second dielectric layer 252. In the direction perpendicular to the plane where the light-emitting structure 20 is located, the first dielectric layer 251 is located on the side of the second dielectric layer 252 facing the light-emitting structure 20.

In one embodiment, the first dielectric layer 251 and the second dielectric layer 252 with different refractive indices are arranged in a stacked way. One of first dielectric layer 251 and the second dielectric layer 252 that is closer to the light-emitting structure 20 may have a greater refractive index. When the light emitted by the light-emitting elements 22 exits toward the first reflection layer 25, the first dielectric layer 251 and the second dielectric layer 252 with different refractive indices may reflect part of the light to form reflected light. Part of the light may pass through the first dielectric layer 251 and the second dielectric layer 252 and then continue to exit toward the diffusion plate 28. Accordingly, part of the light emitted by the light-emitting elements 22 to the first reflection layer 25 may be reflected to the side near the outer edges of the light-emitting area 10. For example, part of the light may be reflected to the second light-emitting area 12. In this way, the amount of light in the second light-emitting area 12 may be increased, and thus the luminous brightness in the second light-emitting area 12 may be improved. As such, the problems of dark areas and dark corners in the display process of the edge area (such as the second light-emitting area 12) in the light-emitting area 10 in existing technologies may be avoided. Accordingly, the overall luminous uniformity of the backlight module 100 may be improved, and the corresponding display device may thus have a good display effect.

In the first dielectric layer 251 with a relatively large refractive index and the second dielectric layer 252 with a relatively small refractive index, the first dielectric layer 251 is disposed on a side of the second dielectric layer 252 facing the light. The first dielectric layer 251 is an optically denser medium, and the second dielectric layer 252 is an optically thinner medium. When the light emitted by the light-emitting elements 22 exits from the optically denser medium to the optically thinner medium, part of the light may produce a total reflection phenomenon at the interface between the optically denser medium and the optically thinner medium, that is, the surface where the first dielectric layer 251 and the second dielectric layer 252 are in contact. In this way, the first reflection layer 25 may reflect the light and the reflected light may exit to the edge area (such as the second light-emitting area 12) of the light-emitting area 10.

It should be added that the first reflection layer 25 including the first dielectric layer 251 and the second dielectric layer 252 with different reflectivity values may specifically be a distributed Bragg reflection (DBR) structure.

It should be noted that, the first reflection layers 25 with different thicknesses may be used to reflect light with different colors, to achieve specific reflection of light with different colors, such that a user may perform specific reflection treatment of light with a desired color. When the reflection structure 30 only includes the first reflection layer 25 with one thickness, the reflection structure 30 may only be used to reflect light with one color, and light with other colors may pass through the first dielectric layer 251 and the second dielectric layer 252 and then continue to exit toward the diffusion plate 28.

The present disclosure also provides an optional setting method. The first dielectric layer 251 has a refractive index of α1, and the second dielectric layer 252 has a refractive index of α2, with refractive index difference $(\alpha1-\alpha2) \geq 0.4$. When $(\alpha1-\alpha2) \leq 0.4$, the refractive index difference between the first dielectric layer 251 and the second dielectric layer 252 may be relatively small. A DBR structure may not be formed, and the reflection effect of the first reflection layer 25 on the incident light may not be achieved. As such, in the present disclosure, the refractive index difference between the first dielectric layer 251 and the second dielectric layer 252 is equal to or greater than approximately 0.4. Accordingly, the refractive index difference between the two adjacent dielectric layers may be larger, and thus part of the light incident into the first reflection layer 25 may be totally reflected.

The first reflection layer 25 may be made of insulating materials. The first dielectric layer 251 with a relatively high refractive index may be made of one or a combination of materials including $TiO_2$, $Ta_2O_5$, $HfO_2$, $Ti_3O_5$, and $Nb_2O_5$. The second dielectric layer 252 with a relatively small refractive index may be made of one or a combination of materials including $SiO_2$, $Si_x$, $Al_2O_3$, and $MgF$.

In one embodiment, the refractive index of the dielectric layer with a larger refractive index may be greater than approximately 2, and the refractive index of the dielectric layer with a smaller refractive index may be less than approximately 1.5. In this case, the refractive index difference may be $(\alpha1-\alpha2) \geq 0.5$. The greater the refractive index difference between the two adjacent dielectric layers, the better the reflection effect of the formed reflective film (the first reflection layer 25) on light. The refractive index of each of the first dielectric layer 251 and the second dielectric layer 252 may be in a range of approximately 1.0 to 3.0.

Figure 6:
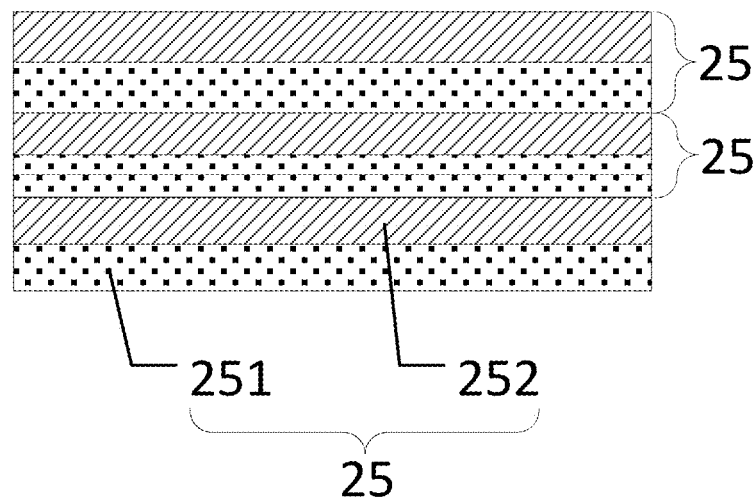
FIG. 6 illustrates another schematic structural diagram of a reflection structure consistent with the disclosed embodiments of the present disclosure.
Figure 7:
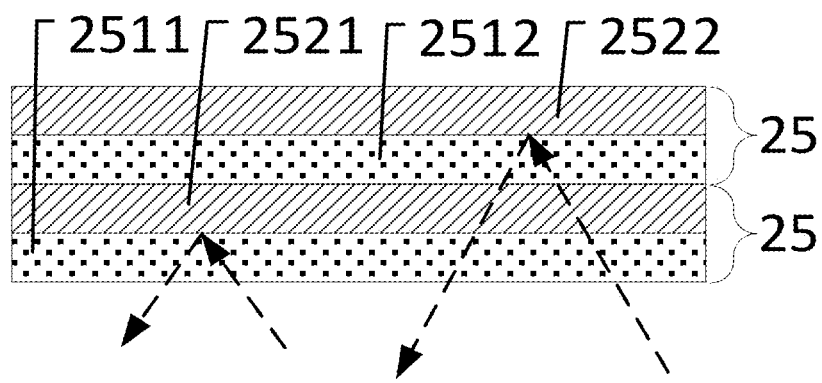
FIG. 7 illustrates another schematic structural diagram of a reflection structure consistent with the disclosed embodiments of the present disclosure.

FIG. 6 illustrates another schematic structural diagram of a reflection structure consistent with the disclosed embodiments of the present disclosure. FIG. 7 illustrates another schematic structural diagram of a reflection structure consistent with the disclosed embodiments of the present disclosure. With reference to FIGS. 6 and 7 in conjunction with FIGS. 1 and 2, optionally, along the direction perpendicular to the plane where the light-emitting structure 20 is located, the reflection structure 30 may include at least two first reflection layers 25 arranged in a stacked way.

Specifically, the present disclosure also provides an optional setting method. Along the direction perpendicular to the plane where the light-emitting structure 20 is located, the reflection structure 30 may include a plurality of the first reflection layers 25 arranged in a stacked way. For example, the reflection structure 30 may include two layers (as shown in FIG. 7) or three layers (as shown in FIG. 6) of the first reflection layers 25 arranged in a stacked way. A user may choose a quantity of the first reflection layers 25 included in the reflection structure 30 according to requirements.

When the reflection structure 30 includes two first reflection layers 25 arranged in a stacked way, along the direction from the light-emitting structure 20 to the diffusion plate 28, the reflection structure 30 may include a first sub-first dielectric layer 2511, a first sub-second dielectric layer 2521, a second sub-first dielectric layer 2512, and a second sub-second dielectric layer 2522. The refractive index of the first sub-first dielectric layer 2511 is greater than the refractive index of the first sub-second dielectric layer 2521. The refractive index of the second sub-first dielectric layer 2512 is greater than the refractive index of the second sub-second dielectric layer 2522. In this way, when the light emitted by the light-emitting elements 22 exits toward the reflection structure 30, when the light arrives at the interface between the first sub-first dielectric layer 2511 and the first sub-second dielectric layer 2521, part of the light may be totally reflected. Part of the light may pass through the first sub-first dielectric layer 2511 and the first sub-second dielectric layer 2521 and continue to exit toward the diffusion plate 28. Also, when light arrives at the interface between the second sub-first dielectric layer 2512 and the second sub-second dielectric layer 2522, part of the light may be totally reflected, and part of the light may pass through the second sub-first dielectric layer 2512 and the second sub-second dielectric layer 2522 and continues to exit toward the diffusion plate 28. With such an arrangement, a greater amount of light emitted by the light-emitting elements 22 may be reflected by the reflection structure 30 toward the side near the outer edge of the light-emitting area 10. Accordingly, the luminous brightness of the edge area in the light-emitting area 10 may be improved, and problems of dark areas and dark corners in the edge area may be avoided.

It should be noted that, when the reflection structure 30 includes two layers of first reflection layers 25 arranged in a stacked way, the refractive indices of the first sub-first dielectric layer 2511 and the second sub-first dielectric layer 2512 may be selected to be same, or the refractive indices of the first sub-first dielectric layer 2511 and the second sub-first dielectric layer 2512 may be selected to be different. The refractive indices of the first sub-second dielectric layer 2521 and the second sub-second dielectric layer 2522 may be selected to be same, or the refractive indices of the first sub-second dielectric layer 2521 and the second sub-second dielectric layer 2522 may be selected to be different. The present disclosure does not specifically limit the refractive indices of the first reflection layers 25, provided that the refractive indices of the two dielectric layers in a same group of first reflection layer 25 are different such that part of the light may be totally reflected and part of the light may be transmitted.

With reference to FIGS. 1, 2, and 5, optionally, along the direction perpendicular to the plane where the light-emitting structure 20 is located, the thickness of the first dielectric layer 251 is $d_1$, and the thickness of the second dielectric layer 252 is $d_2$, with $\lambda=2\times(n_1\times d_1+n_2\times d_2)$. Here, $\lambda$ is the wavelength of light emitted from the light-emitting elements 22 to the first reflection layer 25, $n_1 \geq 1$, $n_2 \geq 1$, each of $n_1$ and $n_2$ is a positive integer, and each of $d_1$ and $d_2$ is a positive number.

Specifically, the present disclosure also provides an optional setting method. Along the direction perpendicular to the plane where the light-emitting structure 20 is located, the first dielectric layer 251 and the second dielectric layer 252 in each first reflection layer 25 may have different thicknesses. For example, the thickness of the first dielectric layer 251 is $d_1$, and the thickness of the second dielectric layer 252 is $d_2$, with $\lambda=2\times(n_1\times d_1+n_2\times d_2)$. In this way, the first reflection layer 25 may form a DBR structure. When light is irradiated on the contacting surface between the first dielectric layer 251 and the second dielectric layer 252 with different refractive indices, a partial total reflection phenomenon may occur. Accordingly, part of the light that is expected to exit from the first light-emitting area 11 may be reflected to the second light-emitting area 12, and the luminous brightness of the second light-emitting area 12 may thus be increased.

In addition, since the thickness of the first reflection layer 25 is related to the wavelength $\lambda$ of the light irradiated on the surface of the first reflection layer 25, a user may set the thickness of the first reflection layer 25 differently and in a targeted manner according to the color of the light to be reflected. For example, when the first reflection layer 25 is expected to reflect part of red light, a wavelength $\lambda_1$ of the red light may be estimated according to $\lambda_1=2\times(n_1\times d_1+n_2\times d_2)$. When the first reflection layer 25 is expected to reflect part of green light, a wavelength $\lambda_2$ of the green light may be estimated according to $-2=2\times(n_1\times d_1+n_2\times d_2)$. When the first reflection layer 25 is expected to reflect part of blue light, a wavelength $\lambda_3$ of the blue light may be estimated according to $23=2\times(n_1\times d_1+n_2\times d_2)$. When the value of $\lambda$ is different, the thickness $d_1$ of the first dielectric layer 251 and the thickness $d_2$ of the second dielectric layer 252 may be adjusted accordingly. Accordingly, corresponding to different $\lambda$ values, the first reflection layer 25 may have different thicknesses. As such, to make the reflection structure 30 to reflect light with a plurality of colors simultaneously, the reflection structure 30 may be set to include first reflection layers 25 with different thicknesses corresponding to the wavelength of each color, to achieve reflection for each color in a targeted way.

As such, the first reflection layers 25 with different thicknesses may be used to reflect light of different colors, and specific reflections of light with different colors may be achieved. Accordingly, specific reflection treatment of light with desired color required by a user may be realized. Since realization of the reflection structure 30 including more than three first reflection layers 25 set in a stacked way may be difficult, the reflection structure 30 may be set to include three or less first reflection layers 25.

In the formula $2=2\times(n_1\times d_1+n_2\times d_2)$, $n_1$ may be equal to $n_2$, or $n_1$ may be different from $n_2$. The present disclosure does not specifically limit whether $n_1$ and $n_2$ are equal. In the present disclosure, $n_1$ and $n_2$ are positive integers. For example, $n_1$ and $n_2$ may take integers such as 1, 2, 3, and 4. The present disclosure does not limit specific values of $n_1$ and $n_2$.

Figure 8:
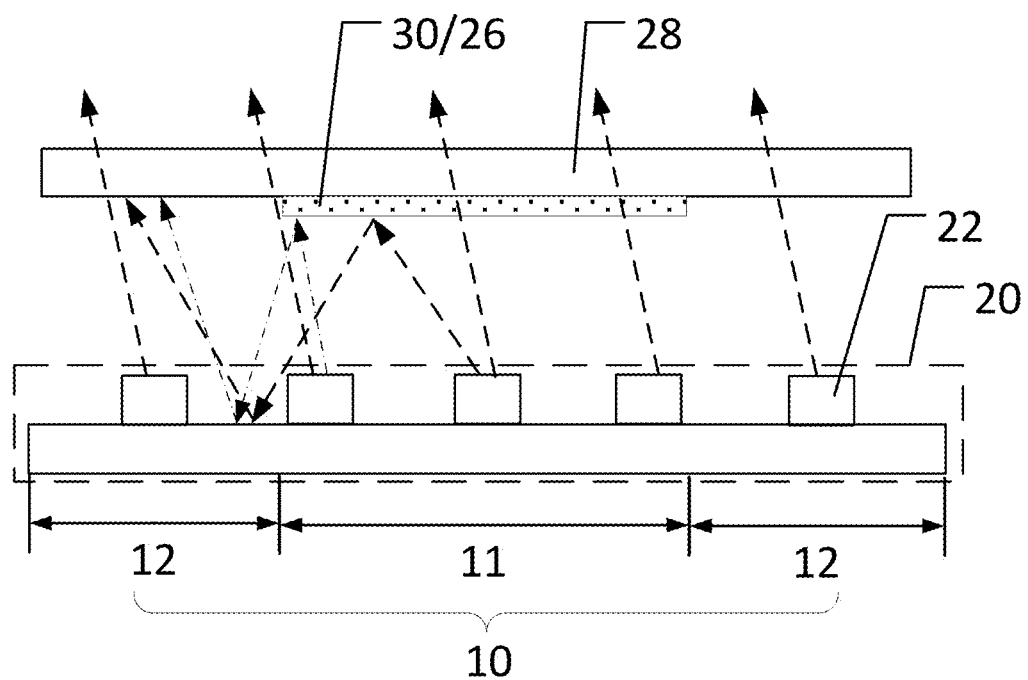
FIG. 8 illustrates another cross-sectional view along AA' in FIG. 1, consistent with the disclosed embodiments of the present disclosure.

FIG. 8 illustrates another cross-sectional view along AA' in FIG. 1, consistent with the disclosed embodiments of the present disclosure. With reference to FIGS. 1 and 8, optionally, the reflection structure 30 may include at least one second reflection layer 26. The second reflection layer 26 may be disposed on a surface of the diffusion plate 28 by printing or coating.

Specifically, the present disclosure also provides an optional setting method of the reflection structure 30. The reflection structure 30 may include a second reflection layer 26. The second reflection layer 26 may be disposed on the surface of the diffusion plate 28 by printing or coating. That is, the second reflection layer 26 may specifically be a coating structure with a reflection effect.

By setting the second reflection layer 26, when the light emitted by the light-emitting elements 22 exits toward the diffusion plate 28 and is irradiated on the surface of the second reflection layer 26 facing the light-emitting structure 20, part of the light may be reflected by the second reflection layer 26, and part of the light may pass through the second reflection layer 26 and the diffusion plate 28 and then exit further. At this time, part of the light may be reflected by the second reflection layer 26 to the side near the outer edge of the light-emitting area 10. That is, part of the light may be reflected to the second light-emitting area 12. In this way, the amount of light in the second light-emitting area 12 may be increased, and the luminous brightness in the second light-emitting area 12 may thus be improved. Accordingly, the problems of dark areas and dark corners in the display process of the edge area (such as the second light-emitting area 12) in the light-emitting area 10 in existing technologies may be avoided. At same time, part of the light may pass through the second reflection layer 26 and the diffusion plate 28 and exit further. Accordingly, image display function of an area corresponding to the first light-emitting area 11 may not be affected by the second reflection layer 26, overall luminous uniformity of the backlight module 100 may be improved, and the corresponding display device may thus have a good display effect.

The second reflection layer 26 may be formed by printing. A surface of the second reflection layer 26 away from the diffusion plate 28 may be a flat surface, or a rough surface. The present disclosure does not specifically limit surface characteristics of the second reflection layer 26, provided that the second reflection layer 26 may be used for specific reflection and diffusion of part of light.

Figure 9:
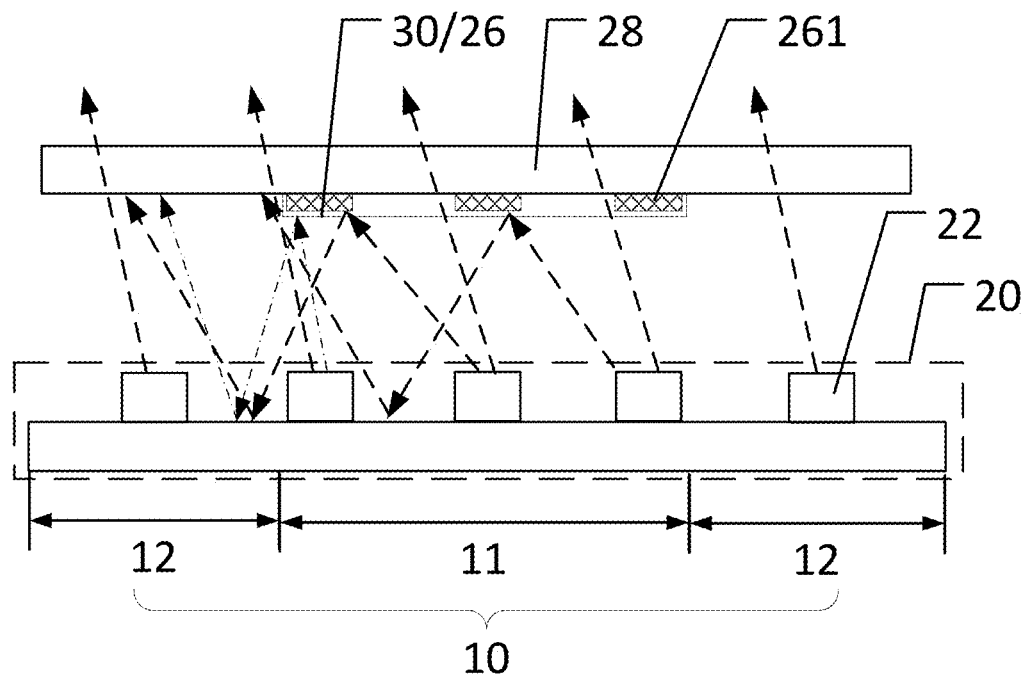
FIG. 9 illustrates another cross-sectional view along AA' in FIG. 1, consistent with the disclosed embodiments of the present disclosure.

FIG. 9 illustrates another cross-sectional view along AA' in FIG. 1, consistent with the disclosed embodiments of the present disclosure. With reference to FIGS. 1 and 9, optionally, along a direction parallel to the plane where the diffusion plate 28 is located, the second reflection layer 26 may include at least one sub-second reflection layer 261. In the first light-emitting area 11, the quantity of sub-second reflection layers 261 is K1, and the quantity of light-emitting elements 22 is K2, with K1=K2.

Along the direction perpendicular to the plane where the light-emitting structure 20 is located, the sub-second reflection layer 261 at least partially overlap the light-emitting element 22 correspondingly disposed.

Specifically, the present disclosure also provides an optional setting method of the reflection structure 30. The reflection structure 30 may include a second reflection layer 26. The second reflection layer 26 may be disposed on a surface of the diffusion plate 28 by printing or coating. That is, the second reflection layer 26 may specifically be a coating structure with a reflection effect.

In one embodiment, the second reflection layer 26 may include a plurality of sub-second reflection layers 261 arranged at intervals. In the first light-emitting area 11, the sub-second reflection layers 261 may be disposed in one-to-one correspondence with the light-emitting elements 22. That is, when the quantity of the light-emitting elements 22 in the first light-emitting area 11 is K2, the quantity of sub-second reflection layers 261 correspondingly disposed in the first light-emitting area 11 may be selected to be K1, with K1=K2.

Further, when the sub-second reflection layers 261 in the first light-emitting area 11 are disposed in one-to-one correspondence with the light-emitting elements 22, along the direction perpendicular to the plane where the light-emitting structure 20 is located, the sub-second reflection layers 261 may at least partially overlap the light-emitting elements 22 correspondingly arranged. Alternatively, the sub-second reflection layers 261 may completely overlap the corresponding light-emitting elements 22. Accordingly, in the first light-emitting area 11, when the light emitted by each light-emitting element 22 during operation is irradiated on the corresponding and adjacent sub-second reflection layer 261, part of the light may be reflected by the sub-second reflection layer 261. Some of the reflected light may be reflected to the second light-emitting area 12, such that the amount of light in the second light-emitting area 12 may be increased. Accordingly, the luminous brightness in the second light-emitting area 12 may be improved. When the light emitted by the light-emitting element 22 exits toward the reflection structure 30, part of the light may not be irradiated on the surface of the second sub-reflection layer 261. This part of the light may pass through the reflection structure 30 and then exit to the diffusion plate 28. In addition, for the part of the light irradiated to the surface of the sub-second reflection layer 261, some of the light may be reflected, while some of the light may be transmitted to the diffusion plate 28. Accordingly, the image display function of the area corresponding to the first light-emitting area 11 may not be affected by the second reflection layer 26. As such, the overall luminous uniformity of the backlight module 100 may be improved, and the corresponding display device may thus have a good display effect.

Figure 10:
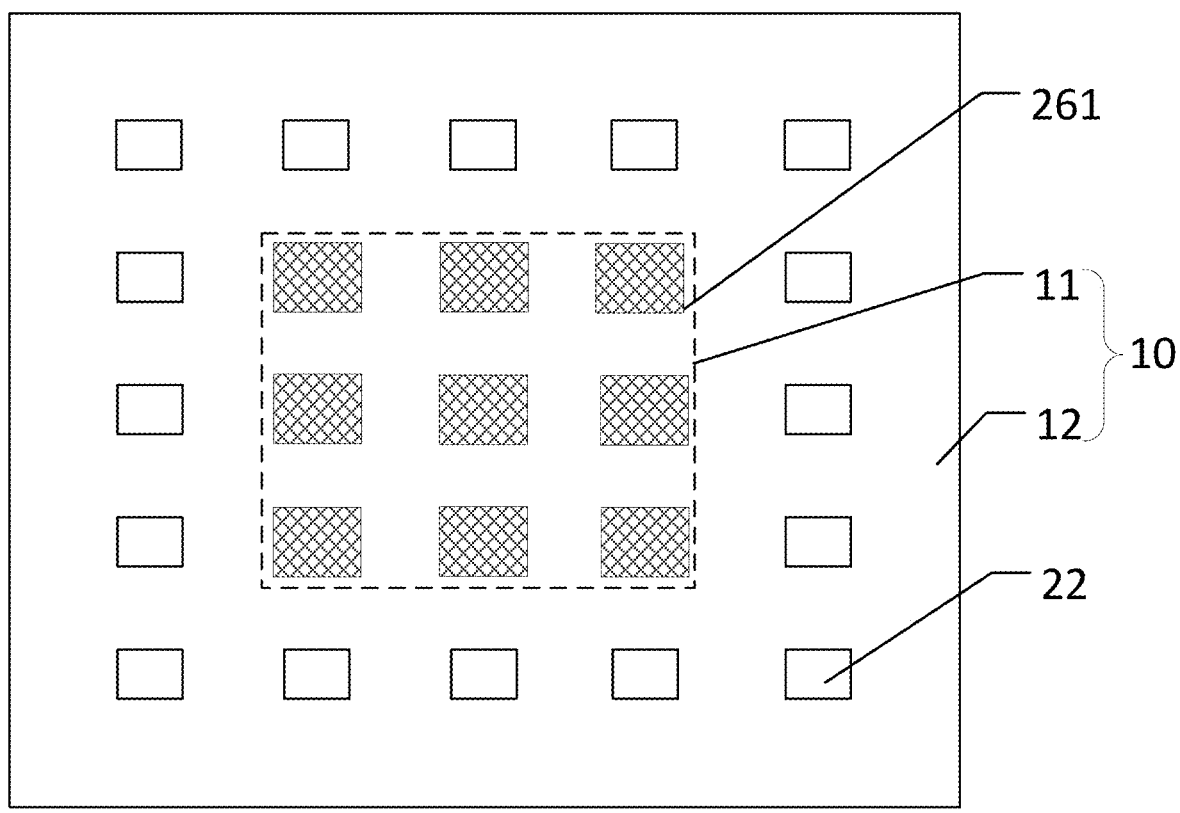
FIG. 10 illustrates a top view of a light-emitting structure and a sub-second reflection layer consistent with the disclosed embodiments of the present disclosure.

FIG. 10 illustrates a top view of a light-emitting structure and a sub-second reflection layer consistent with the disclosed embodiments of the present disclosure. With reference to FIGS. 1, 9 and 10, optionally, along the direction perpendicular to the plane where the light-emitting structure 20 is located, the sub-second reflection layer 261 covers the light-emitting element 22.

Specifically, the present disclosure also provides an optional setting method of the reflection structure 30. The reflection structure 30 may include a second reflection layer 26. The second reflection layer 26 may be disposed on the surface of the diffusion plate 28 by printing or coating. That is, the second reflection layer 26 may specifically be a coating structure with a reflection effect.

In one embodiment, the second reflection layer 26 includes a plurality of sub-second reflection layers 261 disposed at intervals. In the first light-emitting area 11, the sub-second reflection layers 261 may be arranged in one-to-one correspondence with the light-emitting elements 22. Further, along the direction perpendicular to the plane where the light-emitting structure 20 is located, the sub-second reflection layers 261 may cover the light-emitting elements 22 correspondingly arranged. That is, the orthographic projection area of the sub-second reflection layer 261 may be larger than the orthographic projection area of the corresponding light-emitting element 22. Accordingly, in the first light-emitting area 11, more light emitted by each of the light-emitting elements 22 during operation may be irradiated to the corresponding, adjacent sub-second reflection layer 261. As such, more light may be reflected by the second reflection layer 261, and some of the reflected light may be reflected to the second light-emitting area 12. As a result, the amount of light in the second light-emitting area 12 may be increased, and the luminous brightness in the second light-emitting area 12 may thus be improved.

When the light emitted by the light-emitting elements 22 exits toward the reflection structure 30, part of the light may not be radiated to the surface of the second sub-reflection layer 261. This part of light may pass through the reflection structure 30 and then exit to the diffusion plate 28. In addition, for the part of light that is irradiated to the surface of the sub-second reflection layer 261, some of the light may be reflected, while some of the light may be transmitted to the diffusion plate 28. Accordingly, the image display function of the area corresponding to the first light-emitting area 11 may not be affected by the second reflection layer 26. As such, by disposing the reflection structure 30 in the backlight module 100, the display effect of the corresponding display device may be improved.

Figure 11:
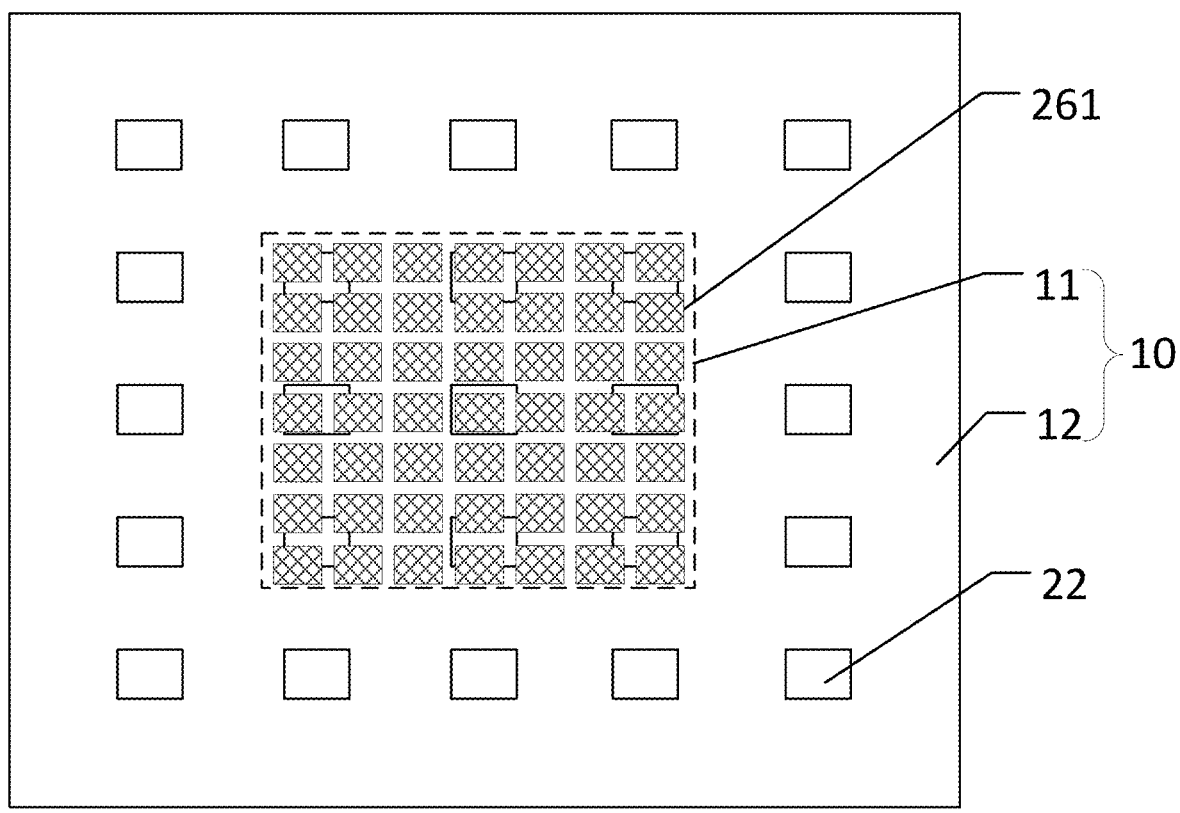
FIG. 11 illustrates another top view of a light-emitting structure and a sub-second reflection layer consistent with the disclosed embodiments of the present disclosure.

FIG. 11 illustrates another top view of a light-emitting structure and a sub-second reflection layer consistent with the disclosed embodiments of the present disclosure. Optionally, along the direction parallel to the plane where the diffusion plate 28 is located, the second reflection layer 26 may include at least one sub-second reflection layer 261. In the first light-emitting area 11, the quantity of the sub-second reflection layers 261 is K1, and the quantity of the light-emitting elements 22 is K2, with K1>K2. Along the direction perpendicular to the plane where the light-emitting structure 20 is located, at least part of the sub-second reflection layers 261 has an overlapping area with at least part of the light-emitting elements 22.

Specifically, the present disclosure also provides an optional setting method of the reflection structure 30. The reflection structure 30 may include a second reflection layer 26. The second reflection layer 26 may be disposed on the surface of the diffusion plate 28 by printing or coating. That is, the second reflection layer 26 may specifically be a coating structure with a reflection effect.

In one embodiment, the second reflection layer 26 may include a plurality of sub-second reflection layers 261 arranged at intervals. In the first light-emitting area 11, the quantity of the sub-second reflection layers 261 may be larger than the quantity of light-emitting elements 22. That is, when the quantity of the light-emitting elements 22 in the first light-emitting area 11 is K2, the quantity of the corresponding sub-second reflection layers 261 in the first light-emitting area 11 may be K1, with K1>K2. Further, along the direction perpendicular to the plane where the light-emitting structure 20 is located, more sub-second reflection layers 261 may have overlapping areas with the light-emitting element 22. As such, in the first light-emitting area 11, more light emitted by each light-emitting element 22 during operation may be irradiated to the surface of the plurality of sub-second reflection layers 261 facing the light-emitting structure 20. Accordingly, more light may be reflected by the second reflection layers 261. Part of the reflected light may be reflected to the second light-emitting area 12, such that the amount of light in the second light-emitting area 12 may be increased. As a result, the luminous brightness in the second light-emitting area 12 may be improved, and the corresponding display device may thus have a good display effect.

Similarly, when the light emitted by the light-emitting elements 22 exits toward the reflection structure 30, part of the light may not be radiated to the surface of the second sub-reflection layer 261. This part of light may pass through the reflection structure 30 and then exit to the diffusion plate 28. In addition, for the part of light that is irradiated to the surface of the sub-second reflection layer 261, some of the light may be reflected, while some of the light may be transmitted to the diffusion plate 28. Accordingly, the image display function of the area corresponding to the first light-emitting area 11 may not be affected by the second reflection layer 26. As such, by disposing the reflection structure 30 in the backlight module 100, the display effect of the corresponding display device may be improved.

Figure 12:
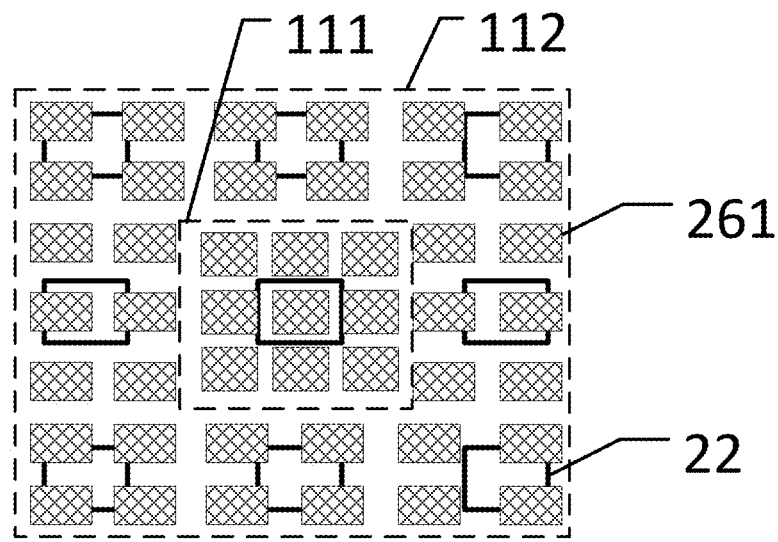
FIG. 12 illustrates a schematic diagram of a first light-emitting area consistent with the disclosed embodiments of the present disclosure.

FIG. 12 illustrates a schematic diagram of a first light-emitting area consistent with the disclosed embodiments of the present disclosure. With reference to FIGS. 1, 9 and 12, optionally, along a direction parallel to the plane where the diffusion plate 28 is located, the second reflection layer 26 may include at least one sub-second reflection layer 261. The first light-emitting area 11 may include a first sub-area 111 and a second sub-area 112, and the second sub-area 112 may surround the first sub-area 111. The arrangement density of the sub-second reflection layer 261 in the first sub-area 111 is $\rho 1$, and the arrangement density of the sub-second reflection layer 261 in the second sub-area 112 is $\rho 2$, with $\rho 1 > \rho 2$.

Specifically, the present disclosure also provides an optional setting method of the reflection structure 30. The reflection structure 30 may include a second reflection layer 26. The second reflection layer 26 may be disposed on the surface of the diffusion plate 28 by printing or coating. That is, the second reflection layer 26 may specifically be a coating structure with a reflection effect.

In one embodiment, the second reflection layer 26 may include a plurality of sub-second reflection layers 261 arranged at intervals. In the first light-emitting area 11, the quantity of the sub-second reflection layers 261 may be greater than the quantity of the light-emitting elements 22. In another embodiment, the quantity of the sub-second reflection layers 261 may be same as the quantity of light-emitting elements 22. In another embodiment, the quantity of sub-second reflection layers 261 may be less than the quantity of light-emitting elements 22. The present disclosure does not specifically limit the relationship between the quantity of the sub-second reflection layers 261 and the quantity of light-emitting elements 22. A user may adjust the number, size, spacing, etc. of the sub-second reflection layers 261 in the first light-emitting area 11 according to requirements.

In one embodiment, the size and the pattern of each sub-second reflection layer 261 are same. The first light-emitting area 11 may include a first sub-area 111 and a second sub-area 112 surrounding the first sub-area 111. The second sub-area 112 is closer to the second light-emitting area 12 than the first sub-area 111. In existing technologies, when the light-emitting elements in the backlight module are uniformly arranged, the luminous brightness near the central area may be greater. For example, in one embodiment, the overall luminous brightness of the second sub-area 112 is about 85%-90% of the luminous brightness of the first sub-area 111.

In one embodiment, the arrangement density $\rho 1$ of the sub-second reflection layer 261 in the first sub-area 111 may be greater than the arrangement density $\rho 2$ of the sub-second reflection layer 261 in the second sub-area 112. That is, the quantity of sub-second reflection layers 261 that are closer to the central area of the light-emitting area 10 (the first sub-area 111) may be larger, or the distance between the sub-second reflection layers 261 that are closer to the central area of the light-emitting area 10 may be smaller. In this way, the area of the sub-second reflection layers 261 that may reflect light in the first sub-area 111 of the first light-emitting area 11 may be larger. Accordingly, more light in the central area of the light-emitting area 10 may be reflected toward the second light-emitting area 12. As such, the amount of light in the central area of the light-emitting area 10 may be reduced, and the amount of light in the edge area may be increased. As a result, the luminous brightness in the second light-emitting area 12 may be improved.

When the light emitted by the light-emitting elements 22 exits toward the reflection structure 30, part of the light may not be radiated to the surface of the second sub-reflection layers 261. This part of light may pass through the reflection structure 30 and then exit to the diffusion plate 28. In addition, for the part of light that is irradiated on the surface of the sub-second reflection layers 261, some of the light may be reflected, while some of the light may be transmitted to the diffusion plate 28. Accordingly, the image display function of the area corresponding to the first light-emitting area 11 may not be affected by the second reflection layer 26. As such, by disposing the reflection structure 30 in the backlight module 100, the display effect of the corresponding display device may be improved.

Figure 13:
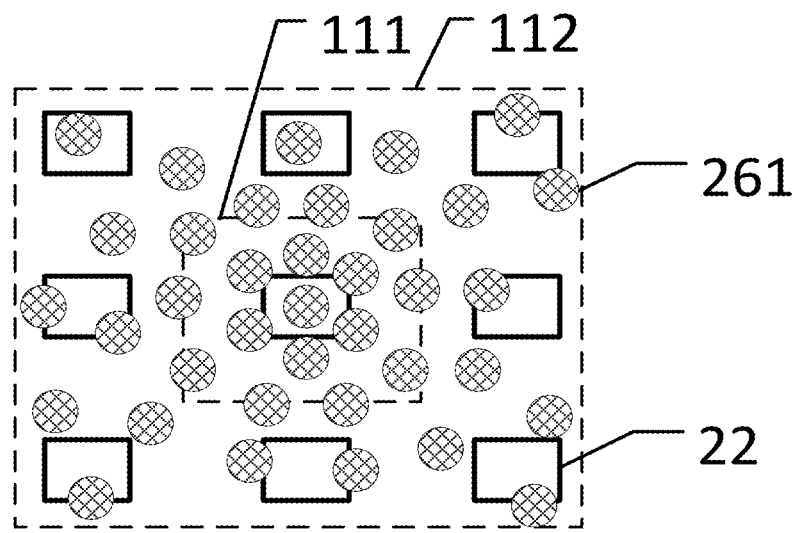
FIG. 13 illustrates another schematic diagram of a first light-emitting area consistent with the disclosed embodiments of the present disclosure.

FIG. 13 illustrates another schematic diagram of a first light-emitting area consistent with the disclosed embodiments of the present disclosure. With reference to FIGS. 1, 9 and 13, optionally, along the direction parallel to the plane where the diffusion plate 28 is located, the second reflection layer 26 may include at least one sub-second reflection layer 261. The first light-emitting area 11 may include a first sub-area 111 and a second sub-area 112, and the second sub-area 112 may surround the first sub-area 111. Along a direction from the first sub-area 111 to the second sub-area 112, the arrangement density of the sub-second reflection layer 261 may decrease.

Specifically, the present disclosure also provides an optional setting method of the reflection structure 30. The reflection structure 30 may include a second reflection layer 26. The second reflection layer 26 may be disposed on the surface of the diffusion plate 28 by printing or coating. That is, the second reflection layer 26 may specifically be a coating structure with a reflection effect.

In one embodiment, the second reflection layer 26 includes a plurality of sub-second reflection layers 261 arranged at intervals. In the first light-emitting area 11, the quantity of the sub-second reflection layers 261 may be set to be greater than the quantity of the light-emitting elements 22. The quantity of the sub-second reflection layers 261 may also be set to be same as the quantity of the light-emitting elements 22. The quantity of the sub-second reflection layers 261 may also be set to be less than the quantity of the light-emitting elements 22. The present disclosure does not specifically limit the relationship between the amounts of the sub-second reflection layers 261 and the light-emitting elements 22. A user may adjust the quantity, size, spacing, pattern, etc. of the sub-second reflection layers 261 in the first light-emitting area 11 according to requirements.

In one embodiment, the size and pattern of each sub-second reflection layer 261 are same, and the first light-emitting area 11 includes a first sub-area 111 and a second sub-area 112 surrounding the first sub-area 111. Along the direction from the first sub-area 111 to the second sub-area 112, the arrangement density of the sub-second reflection layer 261 may exhibit a decreasing trend. That is, the closer to the central area of the light-emitting area 10, the greater the quantity of the sub-second reflection layers 261; or the closer to the central area of the light-emitting area 10, the smaller the distance between the sub-second reflection layers 261. In this way, the area of the sub-second reflection layers 261 that may reflect light in the first sub-area 111 of the first light-emitting area 11 may be larger, and thus more light in the central area of the light-emitting area 10 may be reflected to the second light-emitting area 12. Accordingly, the amount of light in the central area of the light-emitting area 10 may be reduced, and the amount of light in the edge area may be increased. As such, the luminous brightness of the second light-emitting area 12 may be improved, and meanwhile, the light transmittance in the first light-emitting area 11 may be maintained. As a result, the corresponding display device may have a good display effect.

In the present disclosure, when the reflection structure 30 includes a plurality of sub-second reflection layers 261 arranged at intervals, the spacing between adjacently arranged sub-second reflection layers 261 is not specifically limited. A user may set the distance between adjacent sub-second reflection layers 261 according to requirements.

Figure 14:
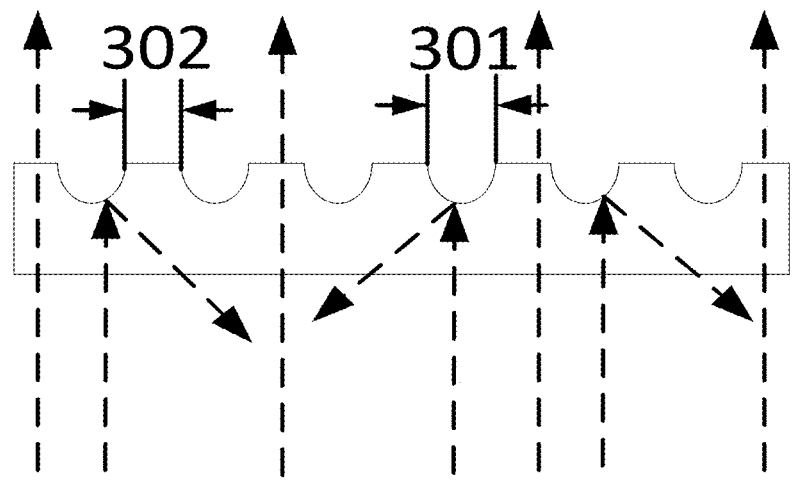
FIG. 14 illustrates another schematic structural diagram of a reflection structure consistent with the disclosed embodiments of the present disclosure.
Figure 15:
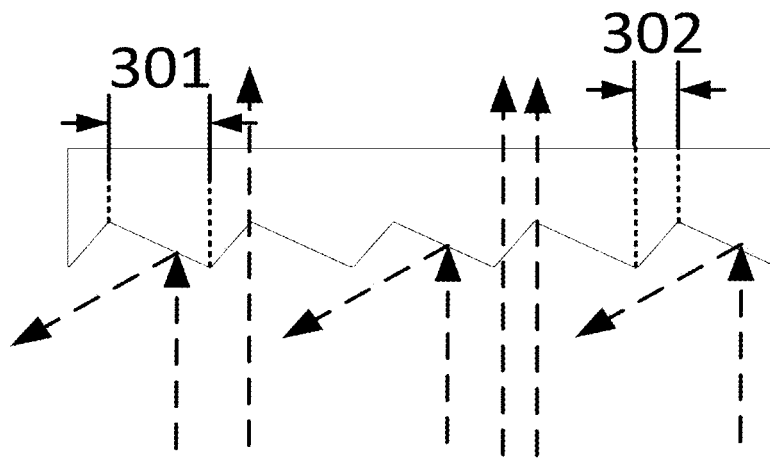
FIG. 15 illustrates another schematic structural diagram of a reflection structure consistent with the disclosed embodiments of the present disclosure.

FIG. 14 illustrates another schematic structural diagram of a reflection structure consistent with the disclosed embodiments of the present disclosure. FIG. 15 illustrates another schematic structural diagram of a reflection structure consistent with the disclosed embodiments of the present disclosure. With reference to FIGS. 1, 2, 14, and 15, optionally, the reflection structure 30 may include a plurality of light-reflective portions 301 and light-transparent portions 302 arranged alternately along a plane parallel to the diffusion plate 28.

Specifically, the present disclosure also provides an optional setting method of the reflection structure 30. The reflection structure 30 may include a plurality of light-reflective portions 301 and light-transparent portions 302 arranged alternately along a direction parallel to the plane where the diffusion plate 28 is located. That is, the reflection structure 30 may be formed by the light-reflective parts 301 and the light-transmitting portions 302 that are alternately arranged. The light-reflective portions 301 may be used to reflect part of the light emitted by the light-emitting elements 22 during operation, preventing the part of the light emitted by the light-emitting elements 22 from exiting to the diffusion plate 28. The light-transparent portions 302 may be used for the light emitted by the light-emitting element 22 during operation to exit to the diffusion plate 28 normally.

Accordingly, due to the existence of the reflective portions 301 in the reflection structure 30, when the light emitted by the light-emitting element 22 exits toward the diffusion plate 28 and is irradiated to the surface of the light-reflective portion 301 facing the light-emitting structure 20, part of the light may be reflected by the light-reflective portion 301. In this case, part of the light may be reflected toward the side near the outer edge of the light-emitting area 10. That is, part of the light may be reflected toward the second light-emitting area 12. As such, the amount of light in the second light-emitting area 12 may be increased, and the luminous brightness in the second light-emitting area 12 may thus be improved. Accordingly, the problems of dark areas and dark corners at the edge area (such as the second light-emitting area 12) of the light-emitting area 10 in the display process in existing technologies may be avoided. As a result, the overall luminous uniformity of the backlight module 100 may be improved, and the corresponding display device may thus have a good display effect.

When the reflection structure 30 includes a plurality of light-reflective parts 301 and light-transparent parts 302 arranged alternately, the reflection structure 30 may specifically be a metal grating polarization splitter. Metal wire grids in the reflection structure 30 may be made of silver material. Along a plane parallel to the diffusion plate 28, taking the width of the light-reflective part 301 as x and the width of the light-transparent part 302 as y as an example, the wavelength of the light may be calculated using the formula $(x+y)(\sin \varphi \pm \sin \theta) = k\lambda$. Here, $(x+y)$ is the grating constant, $\varphi$ is the diffraction angle, $\theta$ is the angle between the incident direction of light and the normal of the grating plane, k is the spectrum order of the bright fringe ($k=0, \pm 1, \pm 2 \ldots$), and $\lambda$ is the wavelength.

Along the direction perpendicular to the plane where the substrate is located, the thickness of the reflection structure 30 may be in a range approximately from 15 μm to 100 μm. For example, the thickness of the reflection structure 30 may be set to be about 60 μm. The present disclosure does not specifically limit specific thickness values of the reflection structure 30, and a user may set the thickness of the reflection structure 30 according to actual needs.

Figure 16:
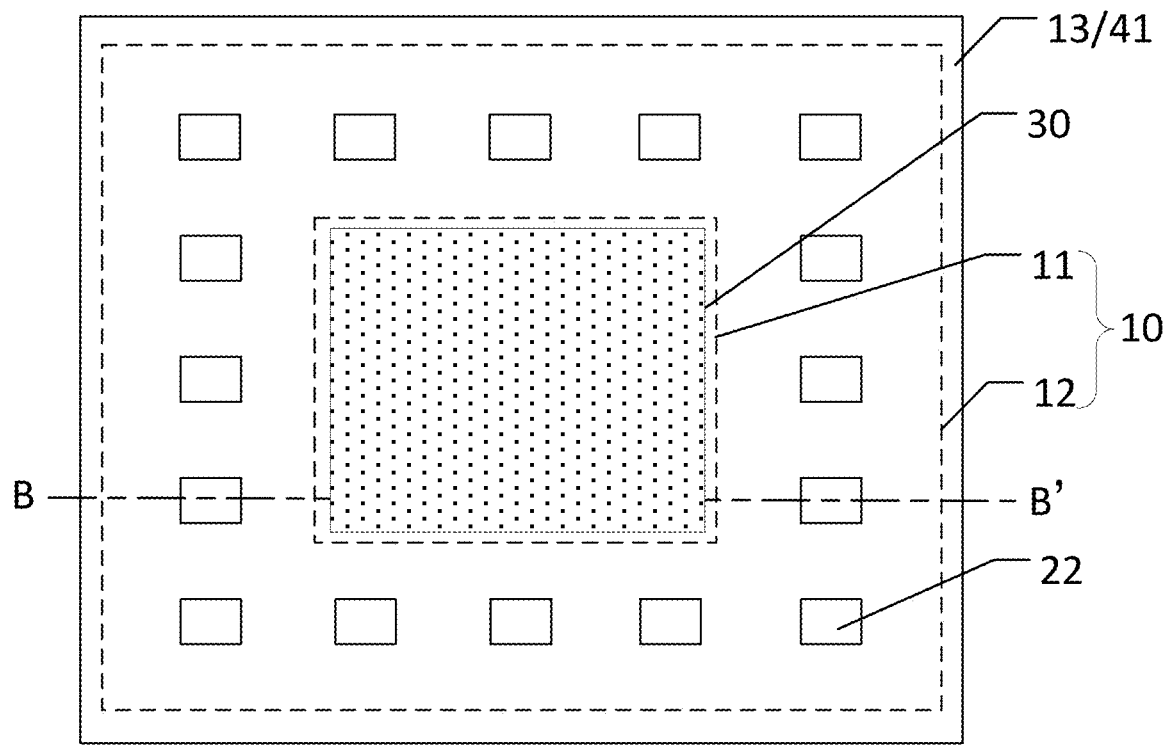
FIG. 16 illustrates another top view of a backlight module consistent with the disclosed embodiments of the present disclosure.
Figure 17:
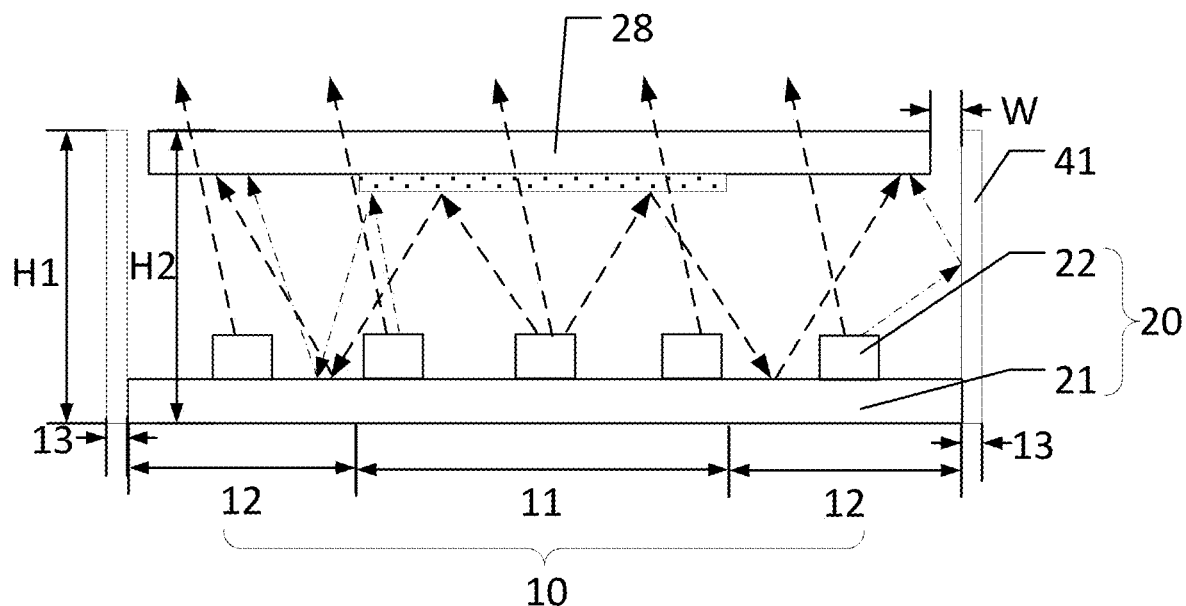
FIG. 17 illustrates a cross-sectional view along BB' in FIG. 16, consistent with the disclosed embodiments of the present disclosure.

FIG. 16 illustrates another top view of a backlight module consistent with the disclosed embodiments of the present disclosure. FIG. 17 illustrates a cross-sectional view along BB' in FIG. 16. With reference to FIGS. 16 and 17, optionally, the backlight module may also include a non-light-emitting area 13 and a reflective sheet 41. The non-light-emitting area 13 at least partially surrounds the light-emitting area 10. The reflective sheet 41 may be located in the non-light-emitting area 13 and disposed around the light-emitting area 10.

The light-emitting structure 20 may also include a substrate 21. The light-emitting elements 22 may be disposed on a side of the substrate 21 facing the diffusion plate 28. Along a direction perpendicular to the plane where the substrate 21 is located, a height of the reflective sheet 41 is H1, and a height between a surface of the substrate 21 away from the diffusion plate 28 and a surface of the diffusion plate 28 away from the substrate 21 is H2, with H1≥H2.

Specifically, the present disclosure also provides an optional setting method. The backlight module 100 also includes a non-light-emitting area 13. The non-light-emitting area 13 may be disposed around the light-emitting area 10. The backlight module 100 may also include a reflective sheet 41 located in the non-light-emitting area 13. The reflective sheet 41 may surround the light-emitting area 10 at least partially or surround the light-emitting area 10 completely. The light-emitting structure 20 of the backlight module 100 may also include a substrate 21. Each of the light-emitting elements 22 may be arranged on a surface of the substrate 21 facing the diffusion plate 28. The light-emitting elements 22 may be fixed at positions set for the light-emitting elements 22, on the substrate 21.

In one embodiment, along the direction perpendicular to the plane where the substrate 21 is located, the height H1 of the reflective sheet 41 may be equal to or greater than the height H2 between the surface of the substrate 21 away from the diffusion plate 28 and the surface of the diffusion plate 28 away from the substrate 21. That is, the height H1 of the reflective sheet 41 may be selected to be greater than the height H2 between the surface of the substrate 21 away from the diffusion plate 28 and the surface of the diffusion plate 28 away from the substrate 21. Accordingly, when the light emitted by the light-emitting elements 22 during operation exits toward the reflective sheet 41, the light may be reflected back by the reflective sheet 41 as much as possible. As such, the loss of the light emitted by the light-emitting elements 22 in the second light-emitting area 12 may be avoided. That is, by disposing the reflective sheet 41 around the non-light-emitting area 13 of the backlight module 100 to prevent light from exiting from the edge of the backlight module 100 to the outside of the non-light-emitting area 13, waste of light may be avoided.

In addition, the light irradiated to the surface of the reflective sheet 41 may be reflected by the reflective sheet 41 toward the light-emitting area 10, and the brightness of the second light-emitting area 12 may thus be improved. Accordingly, the problems of dark areas and dark corners in the second light-emitting area 12 may be avoided, the overall luminous uniformity of the backlight module 100 may be improved, and the corresponding display device may thus have a good display effect.

Figure 18:
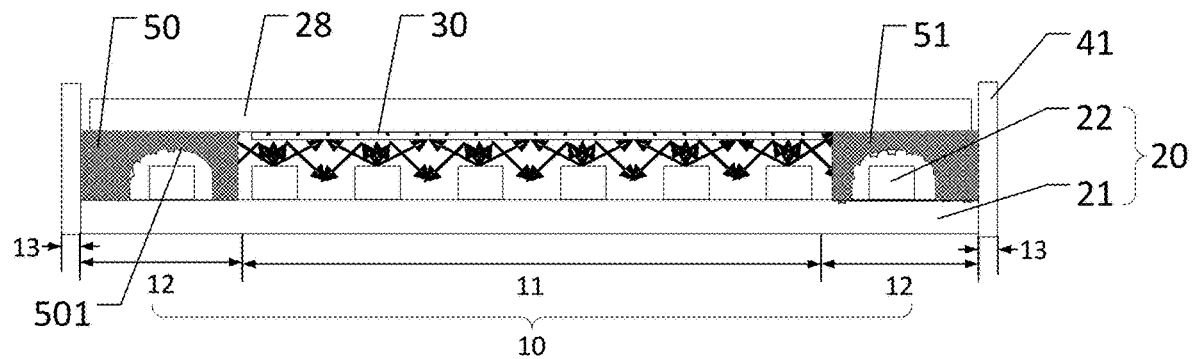
FIG. 18 illustrates another cross-sectional view along BB' in FIG. 16, consistent with the disclosed embodiments of the present disclosure.

FIG. 18 illustrates another cross-sectional view along BB' in FIG. 16, consistent with the disclosed embodiments of the present disclosure. With reference to FIGS. 16-18, the backlight module may also include a light guide 50. The light-emitting structure 20 may also include a substrate 21. The light-emitting elements 22 may be disposed on the side of the substrate 21 facing the diffusion plate 28. The light guide 50 may be disposed in the second light-emitting area 12, and between the substrate 21 and the diffusion plate 28.

Specifically, the present disclosure also provides an optional setting method. The light-emitting structure 20 of the backlight module 100 may also include a substrate 21. Each of the light-emitting elements 22 may be disposed on the surface of the substrate 21 facing the diffusion plate 28. The light-emitting elements 22 may be fixed at positions set for the light-emitting elements 22, on the substrate 21.

In one embodiment, the second light-emitting area 12 in the light-emitting area 10 may include a light guide 50. The light guide 50 may be disposed between the substrate 21 and the diffusion plate 28. The light guide 50 is configured to disperse the light emitted by the light-emitting elements 22 in the second light-emitting area 12. As such, the light emitted by the light-emitting elements 22 in the second light-emitting area 12 may be made to be uniform. Accordingly, the situation may be avoided that the brightness of the area directly corresponding to the light-emitting elements 22 is relatively high while the brightness corresponding to the area between the light-emitting elements 22 is relatively low. In addition, the light guide 50 may be disposed in the second light-emitting area 12. When the light emitted by the light-emitting elements 22 is irradiated to the surface of the reflection structure 30 facing the substrate 21 and is reflected by the reflection structure 30 into the second light-emitting area 12, the light guide 50 may disperse the reflected light. As such, the light reflected into the second light-emitting area 12 may be made to be uniform. Accordingly, the situation may be avoided that some areas in the second light-emitting area 12 have high brightness and some areas have low brightness. That is, by disposing the light guide 50 in the second light-emitting area 12, the light-emitting effect of the second light-emitting area 12 may be made to be uniform, and the display effect of the second light-emitting area 12 of a corresponding display device may be improved.

With continuous reference to FIGS. 16-18, the light guide 50 includes at least one spherical surface 501. The spherical surface 501 may be formed by the surface of the light guide 50 close to the substrate 21 being recessed toward the diffusion plate 28.

Specifically, the present disclosure also provides an optional setting method. The light guide 50 disposed between the substrate 21 and the diffusion plate 28 includes a spherical surface 501. The spherical surface 501 may be formed by the surface of the light guide 50 close to the substrate 21 being recessed toward the diffusion plate 28. The accommodating space formed on the side of the spherical surface 501 facing the substrate 21 may be used for the arrangement of the light-emitting element 22, such that there is a certain space between the surface of the light-emitting element 22 and the light guide 50. That is, the light-emitting element 22 may be disposed in the concave of the spherical surface 501 of the light guide 50. The light emitted by the light-emitting element 22 may at least partly exit into the light guide 50. The light may be reflected and refracted for a plurality of times inside the light guide 50. Accordingly, the mixing distance of the light may be increased, and the light may be prevented from converging in one place. As such, the light distribution may be made to be more uniform, and the display effect of a corresponding display device may be improved. In addition, by setting a certain distance between the light guide 50 and the light-emitting element 22, the influence of the contact between the light guide 50 and the light-emitting element 22 on the yield rate of the light-emitting element 22 may be avoided, and the yield rate of the backlight module 100 may thus be improved.

It should be noted that, in the present disclosure, the spherical surface 501 formed by the surface of the light guide 50 close to the substrate 21 being depressed toward the side of the diffusion plate 28 is a concave with no obvious included angles. If the concave has an obvious included angle, for example, if the concave is a rectangular parallelepiped, a problem of bright lines may appear at right angles of the concave, and the light-emitting effect of the backlight module 100 may thus be affected.

Figure 19:
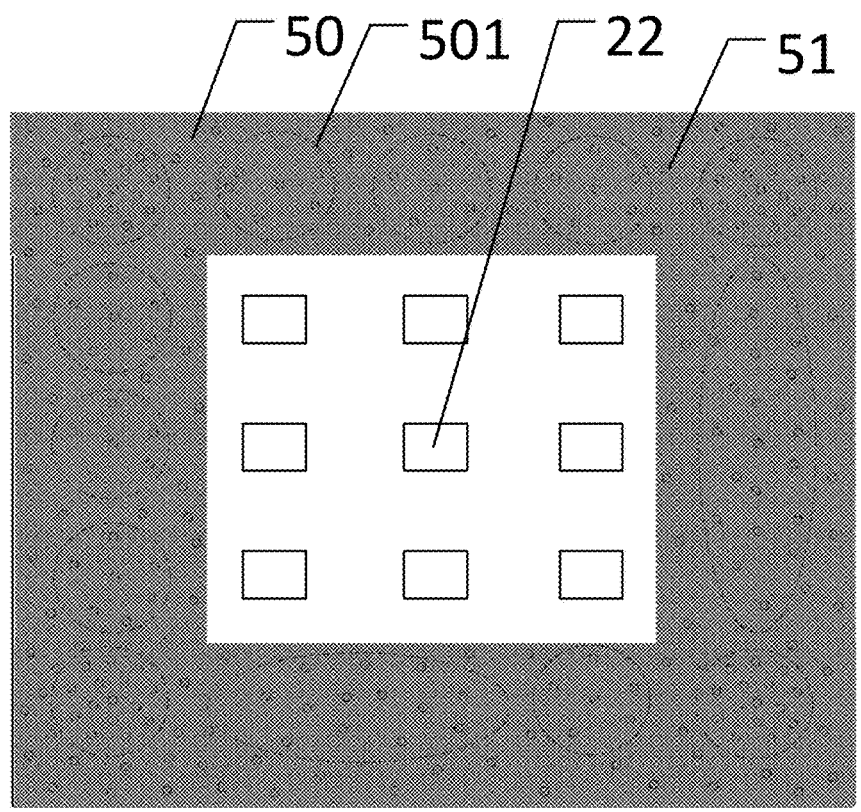
FIG. 19 illustrates a schematic top view of a light guide and a light-emitting element consistent with the disclosed embodiments of the present disclosure.

FIG. 19 illustrates a schematic top view of a light guide and a light-emitting element consistent with the disclosed embodiments of the present disclosure. With reference to FIGS. 16-19, optionally, along a direction perpendicular to the plane where the substrate 21 is located, a spherical surface 501 may overlap with at least one light-emitting element 22.

Specifically, the present disclosure also provides an optional setting method. Along the direction perpendicular to the plane where the substrate 21 is located, each spherical surface 501 of the light guide 50 may have an overlapping area with one or more light-emitting elements 22. For example, as shown in FIG. 19, one spherical surface 501 of the light guide 50 may correspond to one light-emitting element 22, or one spherical surface 501 of the light guide 50 may correspond to two light-emitting elements 22, or one spherical surface 501 of the light guide 50 may correspond to three light-emitting elements 22. The light emitted by the light-emitting element 22 having an overlapping area with the spherical surface 501 may enter the interior of the light guide 50. The light may be reflected and refracted for a plurality of times inside the light guide 50. Accordingly, the mixing distance of the light may be increased, and the light may be prevented from converging at one place. As such, the light distribution may be made to be more uniform, and the display effect of a corresponding display device may thus be improved.

With continuous reference to FIGS. 16-19, optionally, along the direction perpendicular to the plane where the substrate 21 is located, a spherical surface 501 may cover at least one light-emitting element 22.

Specifically, the present disclosure also provides an optional setting method. Along the direction perpendicular to the plane where the substrate 21 is located, each spherical surface 501 of the light guide 50 may cover one or more light-emitting elements 22. As shown in FIG. 19, one spherical surface 501 of the light guide 50 may correspond to one light-emitting element 22, or one spherical surface 501 of the light guide 50 may correspond to two light-emitting elements 22, or one spherical surface 501 of the light guide 50 may correspond to three light-emitting elements 22. The light emitted by the light-emitting element 22 covered by the spherical surface 501 may enter the interior of the light guide 50. The light may be reflected and refracted for a plurality of times inside the light guide 50. Accordingly, the mixing distance of the light may be increased, and the light may be prevented from converging at one place. As such, the light distribution may be made to be more uniform, and the display effect of a corresponding display device may thus be improved.

In addition, when a side of one spherical surface 501 facing the substrate 21 includes only one light-emitting element 22, a portion of the light guide 50 corresponding to the spherical surface 501 may be used to individually control the corresponding light-emitting element 22 to realize regional dimming. As such, the light-emitting effect of the backlight module 100 may be made to be more uniform, and the display effect of the corresponding display device may thus be improved.

In addition, the present disclosure also provides an optional implementation method. Optionally, in the second light-emitting area 12, in an edge area and a corner area far away from the first light-emitting area 11, one spherical surface 501 of the light guide 50 covers one light-emitting element 22. In other areas of the second light-emitting area 12, one spherical surface 501 of the light-guiding member 50 may cover two or more light-emitting elements 22. As such, in the second light-emitting area 12, the luminous brightness of the edge area and the corner area far away from the first light-emitting area 11 may be individually adjusted. As a result, increase of the luminous brightness at the edge area and the corner area in the second light-emitting area 12 may be finely realized. Accordingly, enhancement of the luminous brightness in the second light-emitting area 12 may be more precise, and the display uniformity of the entire area of the corresponding display device may thus be improved.

In one embodiment, the light guide 50 includes a spherical surface 501 that cooperates with the light emitting element 22. By setting the light guide 50, on one hand, the light-emitting surface of the light-emitting elements 22 may be enlarged, and on other hand, the distribution density of the light-emitting elements 22 on the substrate 21 may be optimized to avoid cross-mixing of light between the light-emitting elements 22. In addition, by setting the reflective sheet 41, the light exited to the surface of the reflective sheet 41 through the light guide may be reflected into the light guide again. As such, the light utilization rate may be improved, the light mixing distance may be increased, and a thinner design of the corresponding display module may be achieved.

With continuous reference to FIGS. 16-19, optionally, the light guide 50 may further include mesh points 51 located on the surface of the light guide 50 facing the substrate 21.

Specifically, the present disclosure also provides an optional setting method. The light guide 50 may include mesh points 51. When the light guide 50 includes a spherical surface 501, the mesh points 51 may be disposed at least on the side of the light guide 50 with the spherical surface 501. When the side of the light guide 50 facing the substrate 21 includes a spherical surface 501 and a plane, the mesh points 51 may be set not only on the side of the spherical surface 501, but also on the entire surface of the light guide 50 facing the substrate 21.

By disposing the mesh points 51 on the surface of the light guide 50 facing the substrate 21, when the light emitted by the light-emitting element 22 is irradiated to the mesh points 51, part of the mesh points 51 may disperse part of the light. Accordingly, the light in an area on the side of the spherical surface 501 facing the substrate 21 may be evenly distributed, and occurrence of dark areas in the area corresponding to the spherical surface 501 may be avoided. Furthermore, when part of the light inside the light guide 50 is irradiated to the mesh points 51, part of the mesh points 51 may make the light be diffused and reflected again. Accordingly, the light mixing distance of the light may be further increased, and the light distribution in this area may be more uniform. As a result, the luminous uniformity of the backlight module 100 may be improved.

It should be noted that the mesh point 51 may be a small concave structure formed by laser, or a small convex structure formed by printing. The present disclosure does not specifically limit detailed structures of the mesh point 51. That is, the mesh points 51 disposed on the surface of the light guide 50 may include only small concave structures, or may include only small convex structures, or may include small concave structures and small convex structures.

Figure 20:
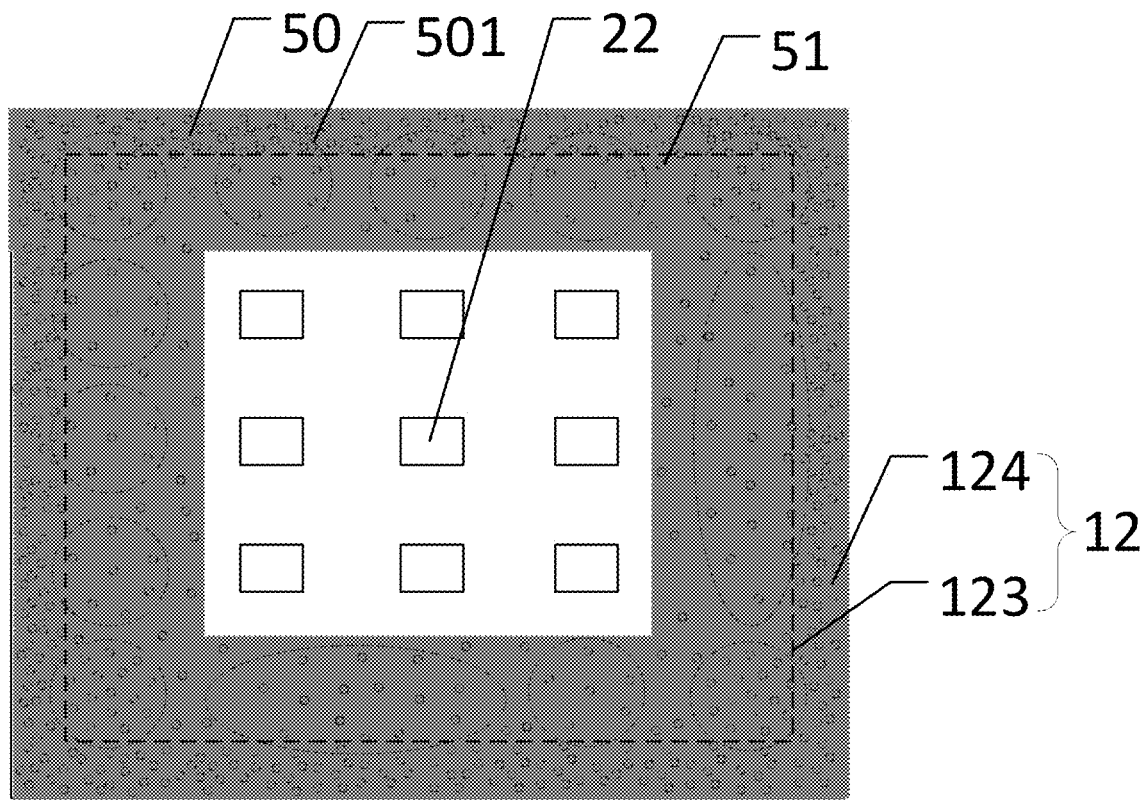
FIG. 20 illustrates another schematic top view of a light guide and a light-emitting element consistent with the disclosed embodiments of the present disclosure.

FIG. 20 illustrates another schematic top view of a light guide and a light-emitting element consistent with the disclosed embodiments of the present disclosure. With reference to FIGS. 16-20, optionally, the second light-emitting area 12 may include a third sub-area 123 and a fourth sub-area 124, and the fourth sub-area 124 surrounds the third sub-area 123. The arrangement density of the mesh points 51 in the third sub-area 123 is $\rho 3$, and the arrangement density of the mesh points 51 in the fourth sub-area 124 is $\rho 4$, with $\rho 3 \leq \rho 4$.

Specifically, the present disclosure also provides an optional setting method. When the surface of the light guide 50 facing the substrate 21 is disposed with the mesh points 51, the second light-emitting area 12 may be divided into a third sub-area 123 and a fourth sub-area 124 surrounding the third sub-area 123. The arrangement density $\rho 3$ of mesh points 51 in the third sub-area 123 may be equal to the arrangement density $\rho 4$ of mesh points 51 in the fourth sub-area 124, or the arrangement density $\rho 3$ of mesh points 51 in the third sub-area 123 may be less than the arrangement density $\rho 4$ of the mesh points 51 in the fourth sub-area 124.

In one embodiment, the arrangement density $\rho 3$ of the mesh points 51 in the third sub-area 123 is less than the arrangement density $\rho 4$ of the mesh points 51 in the fourth sub-area 124. That is, in the second light-emitting area 12, the arrangement density of the mesh points 51 in an area (the fourth sub-area 124) closer to the non-light-emitting area 13 is higher. The higher the arrangement density of the mesh points 51 is, the more the luminous brightness of the corresponding area of the backlight module 100 may be improved. As such, the problems of dark areas in the edge areas and corner areas of the backlight module 100 may be avoided. Accordingly, the overall luminous uniformity of the backlight module 100 may be improved, and the corresponding display device may thus have a good display effect.

In addition, the mesh points 51 in an area closer to the non-light-emitting area 13 may be set to be smaller. When the mesh points 51 are set to be smaller and the arrangement density of the mesh points 51 is higher, the luminous brightness of the corresponding area of the backlight module 100 may be improved better. Accordingly, the overall luminous uniformity of the backlight module 100 may be improved, and the corresponding display device may thus have a better display effect.

It should be noted that, for areas prone to have dark areas and dark corners in the second light-emitting area 12, the arrangement density of the mesh points 51 may be increased in a targeted way, such that the luminous uniformity of the backlight module 100 may be improved directionally.

With reference to FIGS. 1 and 2, optionally, the light-emitting structure 20 may also include a reflection layer 23. The reflection layer 23 may be disposed on the surface of the substrate 21 facing the diffusion plate 28. Along the direction perpendicular to the plane where the substrate 21 is located, the reflection layer 23 and the light-emitting elements 22 do not overlap.

Specifically, the present disclosure also provides an optional setting method. In addition to the substrate 21 and the light-emitting elements 22, the light-emitting structure 20 may also include a reflection layer 23. The reflection layer 23 may be disposed on the surface of the substrate 21 facing the diffusion plate 28. The reflection layer 23 and the light-emitting elements 22 are arranged alternately. In other words, along the direction perpendicular to the plane where the substrate 21 is located, the orthographic projection of the reflection layer 23 and the orthographic projection of the light-emitting elements 22 have no overlapping areas. Moreover, the reflection layer 23 and the light-emitting elements 22 may cover the entire surface of the substrate 21 facing the diffusion plate 28.

The reflection layer 23 may be used to reflect the light irradiated on a surface of the reflection layer 23. For example, when the light emitted by the light-emitting elements 22 is irradiated on the reflection layer 23, the reflection layer 23 may reflect the light toward the diffusion plate 28. As such, the light emitted by the light-emitting element 22 may be irradiated to the side of the light-emitting surface of the backlight module 100, and the luminous brightness of the backlight module 100 may thus be improved. In addition, part of the light may be reflected by the reflection layer 23 to the second light-emitting area 12. Accordingly, the luminous brightness of the second light-emitting area 12 may be improved, dark areas and dark corners in the second light-emitting area 12 may be avoided, and the luminous uniformity of the backlight module 100 may be improved.

In addition, when the light emitted by the light-emitting element 22 exits to the reflection structure 30 or the reflective layer 23, the reflection structure 30 and the reflective layer 23 may reflect at least part of the light irradiated on the surfaces of the reflection structure 30 and the reflective layer 23. Part of the light may be reflected to the surface of the reflection layer 23, and this part of the light may be reflected by the reflective layer 23 again and then exit toward the light-emitting surface of the backlight module 100. In this way, the light mixing distance of the light may be increased. Accordingly, the distribution of the light emitted from the backlight module 100 may be more uniform, and the luminous uniformity of the backlight module 100 may be improved.

In the present disclosure, the reflection layer 23 may be disposed on the surface of the substrate 21 facing the diffusion plate 28 by using highly reflective materials. The reflection layer 23 may be, for example, an ink layer, provided that the light reflection effect may be achieved.

It should also be noted that, for clarity of the drawings, the reflection layer 23 shown in FIG. 2 is not shown in FIG. 1. The reflection layer 23 in FIG. 2 is disposed on regions of the surface of the light-emitting area 10 facing the diffusion plate 28, where no light-emitting elements 22 are disposed.

With reference to FIGS. 16 and 18, optionally, the backlight module may also include inner frame glue. At least part of the light guide 50 may be multiplexed as at least part of the inner frame glue.

Specifically, the present disclosure also provides an optional setting method. The second light-emitting area 12 in the light-emitting area 10 may include a light guide 50. The light guide 50 may be disposed between the substrate 21 and the diffusion plate 28. The light guide 50 may be multiplexed as the inner frame glue in the backlight module 100. Accordingly, corresponding production steps of the inner frame glue in the production process of the backlight module 100 may be omitted, and materials needed to make the inner frame glue may be saved. The inner frame glue is configured to support the substrate 21 and the diffusion plate 28. As such, damage to structural components in the backlight module 100 due to deformation of the distance between the substrate 21 and the diffusion plate 28 may be avoided, and the production yield and service performance of the backlight module 100 may thus be improved. Accordingly, in the present disclosure, by setting the light guide 50 in the backlight module 100 and multiplexing the light guide 50 as the inner frame glue, structure stability of the backlight module 100 may be improved, and the manufacturing process and production cost of the backlight module 100 may be reduced.

With reference to FIGS. 1 and 3, optionally, along the direction perpendicular to the plane where the light-emitting structure 20 is located, the reflection structure 30 may be located within the first light-emitting area 11.

Specifically, the present disclosure also provides an optional setting method. The reflection structure 30 may be disposed only in the first light-emitting area 11. When the light emitted by the light-emitting elements 22 is irradiated on the surface of the reflection structure 30 in the first light-emitting area 11, at least part of the light may be reflected by the reflection structure 30 and then exit toward the second light-emitting area 12. As such, the amount of light in the second light-emitting area 12 may be increased, and the luminous brightness in the second light-emitting area 12 may thus be improved. Accordingly, the problems of dark areas and dark corners in the second light-emitting area 12 may be avoided, the overall luminous uniformity of the backlight module 100 may be improved, and the corresponding display device may thus have a good display effect.

A user may adjust a ratio of the first light-emitting area 11 and the second light-emitting area 12, and shapes of the first light-emitting area 11 and the second light-emitting area 12 in the light-emitting area 10, according to actual needs. The present disclosure does not specifically limit the ratio of the first light-emitting area 11 and the second light-emitting area 12 and the shapes of the first light-emitting area 11 and the second light-emitting area 12.

In one embodiment, an orthographic projection of the reflection structure 30 on the plane where the light-emitting structure 20 is located may have a shape similar to the shape of the light-emitting area 10. In one embodiment, the light-exiting brightness in the second light-emitting area 12 may be lower than approximately 75% of the light-exiting brightness in the central area (the central area of the first light-emitting area 11).

When the reflection structure 30 is fixed on the surface of the diffusion plate 28 facing the substrate 21 by means of adhesive, the use of adhesive may have a certain impact on the transmittance of light. But, since the reflection structure 30 is located in the first light-emitting area 11, the adhesive is only located in the first light-emitting area 11. As such, the use of adhesive may at most make the light-exiting brightness of the first light-emitting area 11 slightly lower. Because the light-exiting brightness of the second light-emitting area 12 is lower than the light-exiting brightness of the first light-emitting area 11, even if the adhesive glue makes the light-exiting brightness of the first light-emitting area 11 slightly lower, the light-exiting brightness of the entire backlight module 100 may become more uniform. Accordingly, the adhesive may not lead to problems of lower light-exiting brightness in the first light-emitting area and overall brightness difference of the entire backlight module 100.

The present disclosure does not specific limit quantities of the light-emitting elements 22 in the first light-emitting area 11 and the second light-emitting area 12 respectively. A user may adjust the quantities of the light-emitting elements 22 set in each of the first light-emitting area 11 and the second light-emitting area 12.

With reference to FIGS. 1 and 2, optionally, a light-reflection rate of the reflection structure 30 is in a range of approximately 10%-50%, and the light-transmission rate of the reflection structure 30 is in a range of approximately 50%-90%.

Specifically, since the reflection structure 30 is disposed on a path in the backlight module 100 where light needs to exit, the reflector structure 30 may not only have the function of reflecting light, but also have a function of light transmission, such that each part of the entire light-emitting area 10 of the backlight module 100 may emit light. The present disclosure provides an optional setting method. The light-reflection rate of the reflection structure 30 is in a range of approximately 10%-50%, and the light-transmission rate of the reflection structure 30 is in a range of approximately 50%-90%.

If the light-transmission rate of reflection structure 30 is less than approximately 50%, and the light-reflection rate is greater than approximately 50%, a problem of low light-exiting brightness of the first light-emitting area 11 may appear. As such, uniformity of the light-exiting brightness of the entire light-emitting area 10 may be reduced. If the light-transmission rate of reflection structure 30 is greater than approximately 90%, and the light-reflection rate is less than approximately 10%, the amount of light that may be reflected by reflection structures 30 to the second light-emitting area 12 may be small. As such, the light compensation effect on dark areas and dark corners in the second light-emitting area 12 may not be satisfied, and the uniformity of the light-exiting brightness of the entire light-emitting area 10 may not be improved. Accordingly, in the present disclosure, the light-reflection rate of the reflection structure 30 is in a range of approximately 10%-50%, and the light-transmission rate of the reflection structure 30 is in a range of approximately 50%-90%. As such, normal light exiting of the backlight module 100 may be realized, a uniform light-exiting effect of the backlight module 100 may be achieved, and a corresponding display device may thus have a good display effect.

With reference to FIGS. 16 and 17, optionally, the light-reflection rate of the reflective sheet 41 is approximately 100%. The reflective sheet 41 may be made of one or a combination of materials including titanium dioxide, barium sulfate, and silver.

Specifically, the present disclosure also provides an optional setting method. The light-reflection rate of the reflective sheet 41 may be set to be approximately 100%. The light irradiated on the surface of the reflective sheet 41 may be totally reflected into the second light-emitting area 12 again, such that the luminous brightness of the second light-emitting area 12 may be improved. In addition, the light may be prevented from exiting from the side of the backlight module 100, such that the influence of light leakage on the display effect of the corresponding display module may be avoided. Accordingly, the corresponding display device may have a good display effect.

The reflective sheet 41 may be made by spraying titanium dioxide, barium sulfate, or silver on a surface of polyethylene terephthalate (PET) material. As such, a thickness of the reflective sheet 41 may be small, and thus the reflective sheet 41 may not significantly increase the area of the non-light-emitting area 13 of the backlight module 100. Accordingly, the narrow-frame effect of the corresponding display device may be maintained.

With reference to FIGS. 16 and 17, optionally, along the direction parallel to the plane where the substrate 21 is located, a first gap W may exist between the reflective sheet 41 and the diffusion plate 28.

Specifically, the present disclosure also provides an optional setting method. The first gap W may be set between the reflective sheet 41 and the diffusion plate 28 along the direction parallel to the plane where the substrate 21 is located. The first gap W may serve as an expansion gap to avoid problems of extrusion deformation and extrusion damage between the reflective sheet 41 and the diffusion plate 28 during use. Accordingly, the production yield and service performance of the backlight module 100 may be improved.

Figure 21:
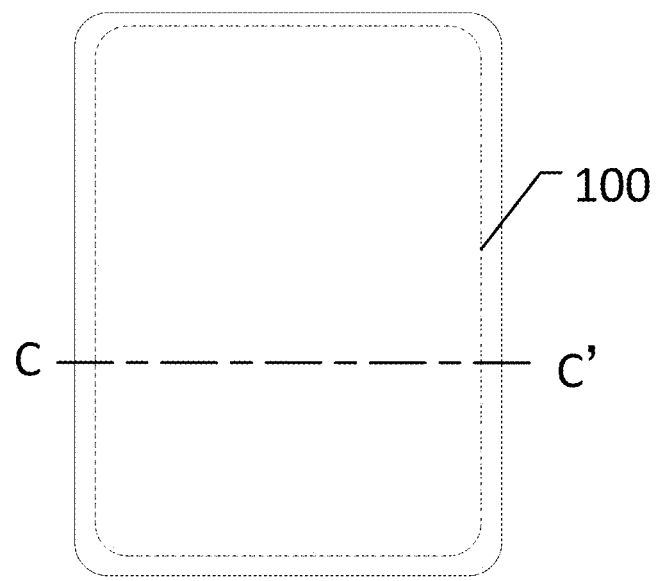
FIG. 21 illustrates a schematic diagram of a display module consistent with the disclosed embodiments of the present disclosure.
Figure 22:
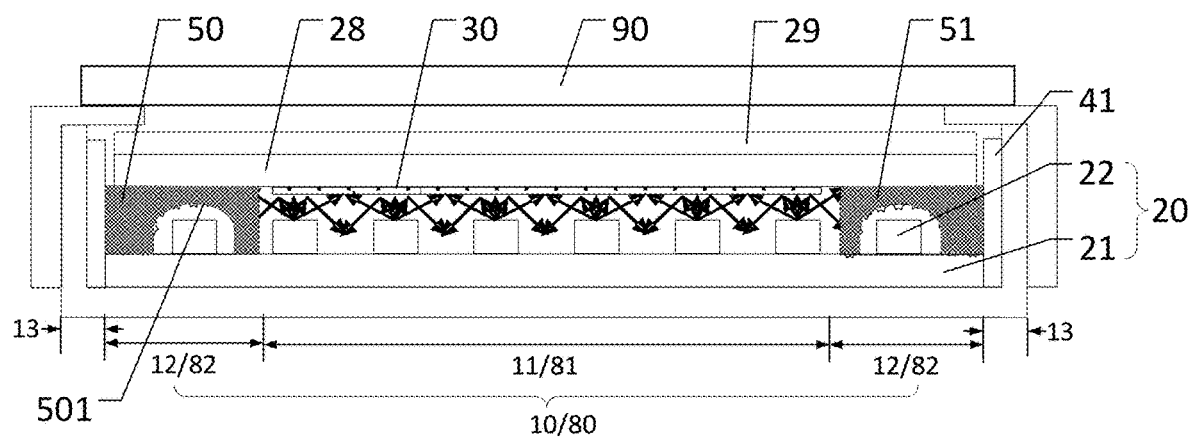
FIG. 22 illustrates a cross-sectional view along CC' in FIG. 21, consistent with the disclosed embodiments of the present disclosure.

FIG. 21 illustrates a schematic diagram of a display module consistent with the disclosed embodiments of the present disclosure. FIG. 22 illustrates a cross-sectional view along CC' in FIG. 21. With reference to FIGS. 21-22 in conjunction with FIGS. 1-20, the present disclosure also provides a display module 200. The display module 200 includes a backlight module 100. The display module 200 also includes a display panel 90. The display panel 90 may be disposed on a side of the diffusion plate 28 away from the light-emitting structure 20.

Specifically, the backlight module 100 included in the display module 200 may be any one of the backlight modules 100 provided in the present disclosure. The display module 200 may include a backlight module 100 and a display panel 90. The display panel 90 may be located on a side of the light-emitting surface of the backlight module 100. Specifically, the display panel 90 may be disposed on a side of the diffusion plate 28 away from the light-emitting structure 20. The backlight module 100 emits light toward the display panel 90 to realize the display effect of the display module 200.

The side of the diffusion plate 28 facing the display panel 90 may also include an optical film 29. The optical film 29 may be used, for example, in combination with the diffusion plate 28 to achieve light mixing and light uniformization for the exiting light, such that the display effect of the corresponding display module 200 may be made to be uniform. The present disclosure does not limit a specific type of the optical film 29. A user may set a quantity of layers and types of the film layers of the optical film 29 according to needs, provided that the normal display function of the display module 200 may be realized and the display module 200 may have a good display effect.

For implementation of the display module 200, reference may be made to the embodiments of the backlight module 100 provided in the present disclosure. The present disclosure will not go into details here.

With reference to FIGS. 21 and 22 in conjunction with FIGS. 1-20, optionally, the backlight module 100 may include a light-emitting area 10. The light-emitting area 10 may include a first light-emitting area 11 and a second light-emitting area 12 at least partially surrounding the first light-emitting area 11.

The display panel 90 includes a display area 80. The display area may include a first display area 81 and a second display area 82. The first display area 81 corresponds to the first light-emitting area 11, and the second display area 82 corresponds to the second light-emitting area 12.

Specifically, the light-emitting area 10 of the backlight module 100 provided by the present disclosure may include the first light-emitting area 11 and the second light-emitting area 12 surrounding the first light-emitting area 11. Correspondingly, the display area 80 of the display panel 90 may include the first display area 81 corresponding to the first light-emitting area 11, and the second display area 82 corresponding to the second light-emitting area 12. By setting at least one of the reflection structures 30, the reflection layer 23, the light guide 50, or the light guide 50 with mesh points 51 in the backlight module 100, images displayed at the first display area 81 and the second display area 82 may be more uniform, and the display effect of the display module 200 may thus be improved.

Figure 23:
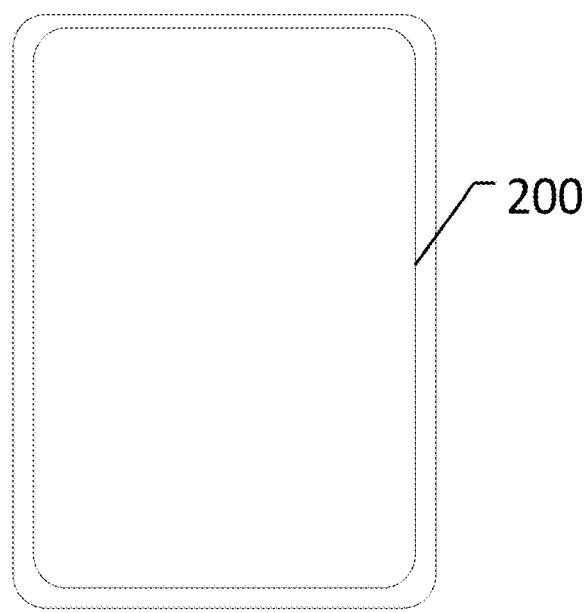
FIG. 23 illustrates a schematic diagram of a display device consistent with the disclosed embodiments of the present disclosure.

FIG. 23 illustrates a schematic diagram of a display device consistent with the disclosed embodiments of the present disclosure. With reference to FIG. 23 in conjunction with FIGS. 1-22, the present disclosure also provides a display device 300. The display device 300 includes a display module 200. The display module 200 may be any one of the display modules 200 provided in the present disclosure.

For implementation of the display device provided by the present disclosure, reference may be made to the embodiments of the display module provided in the present disclosure. The present disclosure will not go into details here. The display device provided by the present disclosure may be any product and component with a display function, such as a mobile phone, a tablet computer, a television, a monitor, a notebook computer, a navigator, etc. That is, the display device may be applied to display fields, such as mobile phones, wearables devices, televisions, monitors, and vehicles.

As disclosed, the technical solutions of the present disclosure have the following advantages.

In the backlight module, the display module and the display device provided by the present disclosure, the reflection structure is disposed on a side of the diffusion plate in the backlight module, facing the light-emitting structure. The reflection structure may have an overlapping area with the first light-emitting area surrounded by the second light-emitting area. The reflection structure may reflect part of the light emitted by the light-emitting elements toward the second light-emitting area, such that the amount of light in the second light-emitting area in the backlight module may be increased. As such, the problem of low brightness in the second light-emitting area may be avoided. Accordingly, the overall luminous uniformity of the backlight module may be improved, and the display device may thus have a good display effect.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A backlight module, comprising:
a light-emitting area, including a first light-emitting area and a second light-emitting area, wherein the second light-emitting area at least partially surrounds the first light-emitting area, the first light-emitting area has a first display uniformity, and the second light-emitting area has a second display uniformity different from the first display uniformity;
a light-emitting structure, including a plurality of light-emitting elements distributed in the light-emitting area;
a diffusion plate, located on a side of a light exiting surface of the light-emitting structure, and at least partially located in the light-emitting area; and
a reflection structure, located on a surface of the diffusion plate facing the light-emitting structure, wherein the reflection structure overlaps with the first light-emitting area, and is structured to reflect partial light emitted from the first light-emitting area to the second light-emitting area such as to reduce a difference between the first display uniformity and the second display uniformity.

2. The backlight module according to claim 1, wherein:
the reflection structure includes at least one first reflection layer;
along a direction perpendicular to a plane where the light-emitting structure is located, the first reflection layer includes a first dielectric layer and a second dielectric layer arranged in a stacked way, and the first dielectric layer is located on a side of the second dielectric layer facing the light-emitting structure;
a refractive index of the first dielectric layer is α1, and a refractive index of the second dielectric layer is α2, with α1>α2; and
along the direction perpendicular to the plane where the light-emitting structure is located, a thickness of the first dielectric layer is d1, and a thickness of the second dielectric layer is d2, with $\lambda = 2 \times (n1 \times d1 + n2 \times d2)$, wherein A is a wavelength of light emitted by the light-emitting elements to the first reflection layer, n1≥1, n2≥1, each of n1 and n2 is a positive integer, and each of d1 and d2 is a positive number.

3. The backlight module according to claim 2, wherein:
along the direction perpendicular to the plane where the light-emitting structure is located, the reflection structure includes at least two first reflection layers arranged in a stacked way.

4. The backlight module according to claim 1, wherein:
the reflection structure includes at least one second reflection layer; and the second reflection layer is disposed on a surface of the diffusion plate by printing or coating.

5. The backlight module according to claim 4, wherein:
along a direction parallel to a plane where the diffusion plate is located, the second reflection layer includes at least one sub-second reflection layer, and in the first light-emitting area, a quantity of the sub-second reflection layer is K1 and a quantity of the light-emitting elements is K2, with K1=K2, and along the direction perpendicular to the plane where the light-emitting structure is located, the sub-second reflection layer at least partially overlap with the light-emitting element correspondingly disposed; or
along a direction parallel to a plane where the diffusion plate is located, the second reflection layer includes at least one sub-second reflection layer, and in the first light-emitting area, a quantity of the sub-second reflection layer is K1 and a quantity of the light-emitting elements is K2, with K1>K2, and along the direction perpendicular to the plane where the light-emitting structure is located, at least part of the sub-second reflection layers have an overlapping area with at least part of the light-emitting elements; or
along a direction parallel to a plane where the diffusion plate is located, the second reflection layer includes at least one sub-second reflection layer, and the first light-emitting area includes a first sub-area and a second sub-area and the second sub-area surrounds the first sub-area, and an arrangement density of the sub-second reflection layer in the first sub-area is ρ1 and an arrangement density of the sub-second reflection layer in the second sub-area is ρ2, with ρ1>ρ2; or
along a direction parallel to a plane where the diffusion plate is located, the second reflection layer includes at least one sub-second reflection layer, and the first light-emitting area includes a first sub-area and a second sub-area and the second sub-area surrounds the first sub-area, and along a direction from the first sub-area to the second sub-area, an arrangement density of the sub-second reflection layer decreases.

6. The backlight module according to claim 5, wherein:
along the direction perpendicular to the plane where the light-emitting structure is located, the sub-second reflection layer covers the light-emitting element.

7. The backlight module according to claim 1, wherein:
the reflection structure includes a plurality of light-reflective portions and a plurality of light-transparent portions arranged alternately along a plane parallel to the diffusion plate.

8. The backlight module according to claim 1, further comprising:
a non-light-emitting area, wherein the non-light-emitting area at least partially surrounds the light-emitting area; and
a reflective sheet, located in the non-light-emitting area and disposed around the light-emitting area,
wherein:
the light-emitting structure further comprises a substrate, and the light-emitting elements are disposed on a side of the substrate facing the diffusion plate; and
along a direction perpendicular to a plane where the substrate is located, a height of the reflective sheet is H1, and a height between a surface of the substrate away from the diffusion plate and a surface of the diffusion plate away from the substrate is H2, with H1≥H2.

9. The backlight module according to claim 1, further comprising a light guide, wherein:
the light-emitting structure further comprises a substrate, and the light-emitting elements are disposed on a side of the substrate facing the diffusion plate; and
the light guide is disposed in the second light-emitting area, and between the substrate and the diffusion plate.

10. The backlight module according to claim 9, wherein:
the light guide includes at least one spherical surface, and the spherical surface is formed by a surface of the light guide close to the substrate being recessed toward the diffusion plate; and
along a direction perpendicular to a plane where the substrate is located, one of the spherical surfaces overlaps with at least one of the light-emitting elements, or along the direction perpendicular to the plane where the substrate is located, one of the spherical surfaces covers at least one of the light-emitting elements.

11. The backlight module according to claim 10, wherein:
the light guide further includes mesh points located on a surface of the light guide facing the substrate;
the second light-emitting area includes a third sub-area and a fourth sub-area, and the fourth sub-area surrounds the third sub-area; and
an arrangement density of the mesh points in the third sub-area is ρ3, and an arrangement density of the mesh points in the fourth sub-area is ρ4, with ρ3≤ρ4.

12. The backlight module according to claim 9, wherein:
the light-emitting structure further comprises a reflection layer, and the reflection layer is disposed on the surface of the substrate facing the diffusion plate; and
along a direction perpendicular to a plane where the substrate is located, the reflection layer and the light-emitting elements do not overlap.

13. The backlight module according to claim 9, further comprising inner frame glue, wherein:
at least part of the light guide is multiplexed as at least part of the inner frame glue.

14. The backlight module according to claim 1, wherein:
along a direction perpendicular to a plane where the light-emitting structure is located, the reflection structure is located within the first light-emitting area.

15. The backlight module according to claim 1, wherein:
a light-reflection rate of the reflection structure is in a range of approximately 10%-50%; and
a light-transmission rate of the reflection structure is in a range of approximately 50%-90%.

16. The backlight module according to claim 8, wherein:
a light-reflection rate of the reflective sheet is approximately 100%; and
the reflective sheet is made of one or a combination of materials including titanium dioxide, barium sulfate, and silver.

17. The backlight module according to claim 8, wherein:
along a direction parallel to the plane where the substrate is located, a first gap exists between the reflective sheet and the diffusion plate.

18. The backlight module according to claim 1, wherein:
an orthographic projection of the reflection structure on a plane where the light-emitting structure is located has a shape similar to a shape of the light-emitting area.

19. A display module, comprising:
a backlight module, including a light-emitting area, a light-emitting structure, a diffusion plate, and a reflection structure; and
a display panel, wherein:
the light-emitting area includes a first light-emitting area and a second light-emitting area, wherein the second light-emitting area at least partially surrounds the first light-emitting area, the first light-emitting area has a first display uniformity, and the second light-emitting area has a second display uniformity different from the first display uniformity;
the light-emitting structure includes a plurality of light-emitting elements distributed in the light-emitting area;
the diffusion plate is located on a side of a light exiting surface of the light-emitting structure, and is at least partially located in the light-emitting area;
the reflection structure is located on a surface of the diffusion plate facing the light-emitting structure, wherein the reflection structure overlaps with the first light-emitting area, and is structured to reflect partial light emitted from the first light-emitting area to the second light-emitting area such as to reduce a difference between the first display uniformity and the second display uniformity;
the display panel is disposed on a side of the diffusion plate away from the light-emitting structure; and
the display panel includes a display area, and the display area includes a first display area and a second display area, wherein the first display area corresponds to the first light-emitting area, and the second display area corresponds to the second light-emitting area.

20. A display device, comprising a display module, wherein the display module comprises:

a backlight module, including a light-emitting area, a light-emitting structure, a diffusion plate, and a reflection structure; and
a display panel,
wherein:
the light-emitting area includes a first light-emitting area and a second light-emitting area, wherein the second light-emitting area at least partially surrounds the first light-emitting area, the first light-emitting area has a first display uniformity, and the second light-emitting area has a second display uniformity different from the first display uniformity;
the light-emitting structure includes a plurality of light-emitting elements distributed in the light-emitting area;
the diffusion plate is located on a side of a light exiting surface of the light-emitting structure, and is at least partially located in the light-emitting area;
the reflection structure is located on a surface of the diffusion plate facing the light-emitting structure, wherein the reflection structure overlaps with the first light-emitting area, and is structured to reflect partial light emitted from the first light-emitting area to the second light-emitting area such as to reduce a difference between the first display uniformity and the second display uniformity; and
the display panel is disposed on a side of the diffusion plate away from the light-emitting structure.

\* \* \* \* \*